(12) United States Patent
Qiao

(10) Patent No.: US 9,396,262 B2
(45) Date of Patent: Jul. 19, 2016

(54) SYSTEM AND METHOD FOR ENHANCING SEARCH RELEVANCY USING SEMANTIC KEYS

(75) Inventor: Hong Liang Qiao, Concord (AU)

(73) Assignee: LEXXE PTY LTD, North Strathfield (AU)

( * ) Notice: Subject to any disclaimer, the term of this patent is extended or adjusted under 35 U.S.C. 154(b) by 263 days.

(21) Appl. No.: 12/112,774

(22) Filed: Apr. 30, 2008

(65) Prior Publication Data

US 2009/0100042 A1    Apr. 16, 2009

Related U.S. Application Data

(60) Provisional application No. 60/998,810, filed on Oct. 12, 2007, provisional application No. 60/999,813, filed on Oct. 18, 2007.

(51) Int. Cl.
G06F 17/30 (2006.01)
(52) U.S. Cl.
CPC ................................ G06F 17/30864 (2013.01)
(58) Field of Classification Search
None
See application file for complete search history.

(56) References Cited

U.S. PATENT DOCUMENTS

| | | | |
|---|---|---|---|
| 5,151,857 A | | 9/1992 | Matsui |
| 7,213,205 B1 | | 5/2007 | Miwa et al. |
| 8,015,183 B2 | | 9/2011 | Frank |
| 2002/0178152 A1* | 11/2002 | Azzam | ............................. 707/3 |
| 2003/0115187 A1* | 6/2003 | Bode et al. | ........................ 707/3 |
| 2003/0130993 A1 | 7/2003 | Mendelevitch et al. | |
| 2004/0002945 A1* | 1/2004 | Shibata | ............................. 707/1 |
| 2004/0054661 A1* | 3/2004 | Cheung et al. | ..................... 707/3 |
| 2005/0108212 A1 | 5/2005 | Karimisetty et al. | |
| 2005/0154690 A1* | 7/2005 | Nitta et al. | ...................... 706/46 |
| 2005/0267871 A1* | 12/2005 | Marchisio et al. | ................. 707/3 |

(Continued)

FOREIGN PATENT DOCUMENTS

| EP | 2045728 A1 | 4/2009 |
|---|---|---|
| EP | 2048585 A2 | 4/2009 |

(Continued)

OTHER PUBLICATIONS

Magnini et al. "A WordNet-based Approach to Named Entities Recognition." ACL. 2002.*

(Continued)

*Primary Examiner* — Syed Hasan

(57) ABSTRACT

A method, computer-usable medium, and a computer system for searching for webpages are disclosed. Embodiments of the present invention provide a convenient and efficient mechanism for filtering results from a keyword search using semantic keys and semantic sub-keys, thereby enabling an increased number of irrelevant results to be filtered from a keyword search. The search query may be parsed to determine the focus of the query, where the focus may be used determine at least one semantic key for the search query. Each semantic key may be associated with at least one semantic sub-key, where the semantic keys and/or the semantic sub-keys may be used to filter the results of the keyword search. As such, broader keyword searches may be performed to include a larger number of relevant results, where the filtering mechanisms of the present invention may then filter an increased number of irrelevant results.

16 Claims, 17 Drawing Sheets

(56) References Cited

U.S. PATENT DOCUMENTS

| | | | |
|---|---|---|---|
| 2006/0010111 | A1 | 1/2006 | Jones et al. |
| 2006/0031216 | A1 | 2/2006 | Semple et al. |
| 2006/0041549 | A1 | 2/2006 | Gundersen et al. |
| 2006/0122997 | A1* | 6/2006 | Lin .................................. 707/5 |
| 2006/0173821 | A1 | 8/2006 | Hennum et al. |
| 2006/0235689 | A1* | 10/2006 | Sugihara et al. ............. 704/257 |
| 2007/0106657 | A1 | 5/2007 | Brzeski et al. |
| 2008/0114750 | A1 | 5/2008 | Saxena et al. |
| 2008/0120279 | A1 | 5/2008 | Xue |
| 2008/0172377 | A1 | 7/2008 | Kapadia et al. |
| 2009/0043749 | A1 | 2/2009 | Garg et al. |
| 2009/0055390 | A1 | 2/2009 | Maeda et al. |
| 2009/0089047 | A1* | 4/2009 | Pell et al. ........................ 704/9 |
| 2009/0182737 | A1 | 7/2009 | Melman |
| 2009/0248511 | A1 | 10/2009 | Mehta et al. |

FOREIGN PATENT DOCUMENTS

| | | |
|---|---|---|
| KR | 1020000050225 | 8/2000 |
| KR | 1020070052028 A | 5/2007 |
| KR | 1020080017686 | 2/2008 |

OTHER PUBLICATIONS

Qiao, Hong Liang. "Lexxe Search Engine." hcsnet.edu.au. Sep. 2006.*

Demartini, Gianluca, "ARES: A Retrieval Engine Based on Sentiments," Proceedings of the 33rd European Conference on Advances in Information Retrieval, Apr. 18, 2011.

Hu et al., "Mining and Summarizing Customer Reviews," Proceedings of the Tenth ACM SIGKDD International Conference on Knowledge Discovery and Data Mining, 2004.

Liu et al., "Opinion Observer: Analyzing and Comparing Opinions on the Web," Proceedings of the 14th International Conference on World Wide Web, pp. 342-351, 2005.

Liu et al., "Opinion Searching in Multi-Product Reviews," Proceedings of the Sixth IEEE International Conference on Computer and Information Technology, 2006.

Popescu et al., "Extracting Product Features and Opinions from Reviews," Proceedings of the Conference on Human Language Technology and Empirical Methods in Natural Language Processing, 2005.

* cited by examiner

| Web Page Words | 1 | 2 | 3 | 4 | 5 | 6 | 7 | ... | 42 | 43 | 44 | 45 | 46 | ... | 82 | 83 | 84 | 85 | 86 | 87 |
|---|---|---|---|---|---|---|---|---|---|---|---|---|---|---|---|---|---|---|---|---|
| Sub-Key/Keyword | | S1 | | K1 | K2 | S2 | S1 | | K2 | S1 | S2 | | K1 | | S1 | S1 | K1 | K2 | | S2 |
| Hotspots | | Hotspot #1 | | | Hotspot #2 | | | | | Hotspot #3 | | | | | | Hotspot #4 | | | | |

1210 — Web Page Words
1220 — Sub-Key/Keyword
1230 — Hotspots

SYSTEM AND METHOD FOR ENHANCING SEARCH RELEVANCY USING SEMANTIC KEYS

RELATED APPLICATIONS

The present application is related to and claims the benefit of U.S. Provisional Patent Application No. 60/998,810, filed Oct. 12, 2007, entitled "SYSTEM AND METHOD FOR ENHANCING SEARCH RELEVANCY WITH SEMANTIC KEYS," naming Hong Liang Qiao as the inventor, assigned to the assignee of the present invention. That application is incorporated herein by reference in its entirety and for all purposes.

The present application is related to and claims the benefit of U.S. Provisional Patent Application No. 60/999,813, filed Oct. 18, 2007, entitled "SYSTEM AND METHOD FOR ENHANCING SEARCH RELEVANCY WITH SEMANTIC KEYS," naming Hong Liang Qiao as the inventor, assigned to the assignee of the present invention. That application is incorporated herein by reference in its entirety and for all purposes.

BACKGROUND OF THE INVENTION

Conventional search engines commonly use keywords from a user-input search query to locate and display webpages. For example, if a user were interested in learning about which countries border the United States, the user may enter a search query of "country bordering United States." In response, a conventional search engine may return webpages with all or some of the four words "country," "bordering," "United," and "States."

However, such a query would likely return a large number (e.g., tens of millions) of irrelevant or undesired webpages. For example, the results may contain webpages about country music in the United States, general information about the Unites States, etc. As such, users generally perform overly restrictive searches to narrow the number of results to a more manageable amount, thereby excluding many relevant webpages from the results. Thus, finding relevant information on the Internet using conventional keyword-based search engines is a tedious and time-consuming undertaking.

Additionally, the number of relevant results returned by conventional search engines is further limited by the literal nature of the conventional keyword search methodology. For example, webpages may use synonyms or other words related to the keywords entered in the search query, but not use one or more of the exact keywords. In this case, conventional keyword-based search engines may not return these webpages, especially where a more restrictive search is used (e.g., using an "and" operator, or the like, between keywords of the search query). Accordingly, searching for relevant information using conventional search engines is made even more cumbersome given the literal nature of conventional keyword searches.

Also, some conventional search engines perform a ranking on the identified results based on a relevance of each webpage to the entered keywords. While this may reorganize the identified results, it does not solve the above-mentioned problems of irrelevant results and other problems associated with the literal nature of conventional keyword-based search engines.

SUMMARY OF THE INVENTION

Accordingly, a need exists for a search engine and search methodology which returns more relevant results. A need also exists for a search engine and search methodology which enables a broader search to be performed while reducing the number of irrelevant results. Additionally, a need exists for a search engine which returns relevant results in a less tedious and time-consuming manner. Embodiments of the present invention provide novel solutions to these needs and others as described below.

Embodiments of the present invention are directed to a method, computer-usable medium, and a computer system for searching for webpages. More specifically, embodiments of the present invention provide a convenient and efficient mechanism for filtering results from a keyword search using semantic keys (e.g., words related to the focus of the search query) and semantic sub-keys (e.g., words related to the semantic key), thereby enabling an increased number of irrelevant results to be filtered from a keyword search. The search query may be parsed (e.g., by a grammatical analyzer) to determine the focus of the query (e.g., the intended meaning of the search query), where the focus may be used determine at least one semantic key for the search query. Each semantic key may be associated with at least one semantic sub-key, where the semantic keys and/or the semantic sub-keys may be used to filter the results of the keyword search (e.g., by excluding webpages returned from the keyword search which do not include at least one of the semantic keys and/or at least one of the semantic sub-keys) and provide more relevant search results. As such, broader keyword searches may be performed to include a larger number of relevant results, where the filtering mechanisms of the present invention may then filter an increased number of irrelevant results to enable more effective internet searching which is less tedious and time consuming.

In one embodiment, a computer-implemented method of searching responsive to a search query includes determining a semantic key related to at least one keyword of said search query, wherein said semantic key is associated with a semantic sub-key. Webpage search results are accessed which are generated from a keyword search using said search query. The webpage search results are filtered using said semantic sub-key to generate filtered webpage search results, wherein said filtered webpage search results comprise a listing (or index) of webpages, wherein at least one webpage of said listing of webpages comprises said semantic sub-key. The semantic sub-key may be selected from a group consisting of a hyponym (e.g., a word which may be categorized under the semantic key, a word related to the semantic key, etc.) and a numerical expression (e.g., an age, a distance, another word related to a number, etc.). The method may also include accessing said webpage search query. Additionally, the method may include determining a focus (e.g., one or more keywords of the search query representing the intended meaning of the search query, one or more other words representing the intended meaning of the search query, etc.) of said webpage search query and determining said semantic key based upon said focus. Further, the filtering may further include comparing said webpage search results with additional webpage search results generated based upon said semantic sub-key, identifying at least one webpage common to said webpage search results and said additional webpage search results, and designating said at least one common webpage as said filtered webpage search results.

The method may also include ranking said filtered webpage search results to generate ranked webpage search results, wherein said filtered webpage search results are ranked based upon information selected from a group consisting of a frequency of said semantic sub-key in each of said at least one webpage, a frequency of said at least one keyword in each of said at least one webpage, and a proximity of said semantic sub-key to said at least one keyword in each of said at least one webpage. Additionally, in one embodiment, the method may also include generating graphical data based upon said filtered webpage search results, said graphical data for generating a presentation of information selected from a group consisting of said listing of webpages and an answer to a question posed using said search query, wherein said answer comprises information from said semantic sub-key and from a webpage of said filtered webpage search results.

BRIEF DESCRIPTION OF THE DRAWINGS

The present invention is illustrated by way of example, and not by way of limitation, in the figures of the accompanying drawings and in which like reference numerals refer to similar elements.

FIG. 12 shows an exemplary word sequential ordering of webpage content which may be used to determine proximity between two portions of the webpage in accordance with one embodiment of the present invention.

DETAILED DESCRIPTION OF THE INVENTION

Figure 1:
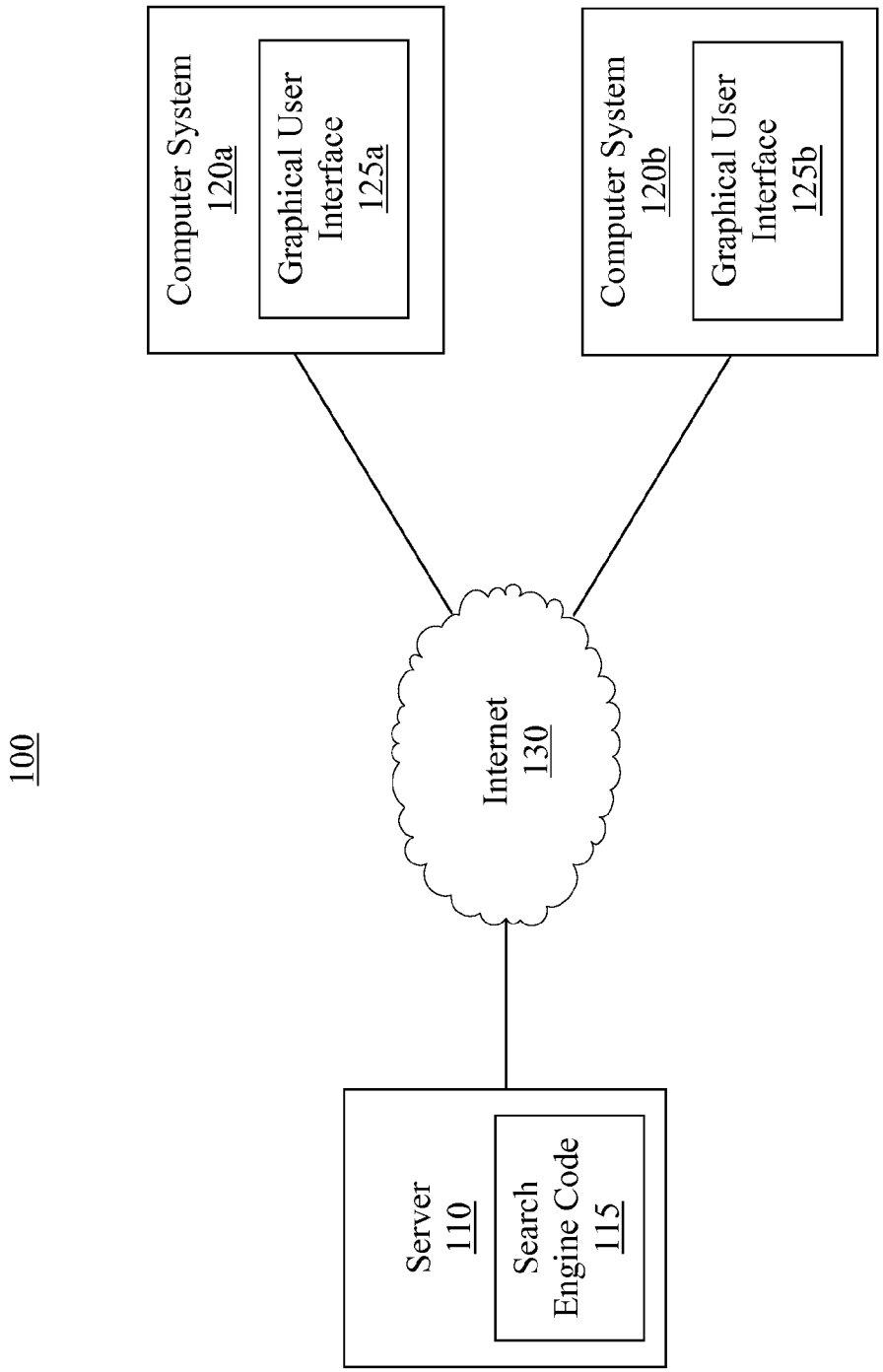
FIG. 1 shows an exemplary system for implementing a search engine in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "depicting," "detecting," "determining," "displaying," "establishing," "executing," "flipping," "generating," "grouping," "hiding," "identifying," "initiating," "interacting," "modifying," "monitoring," "moving," "outputting," "performing," "placing," "presenting," "processing," "programming," "querying," "removing," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary system 100 for implementing a search engine (e.g., an Internet-based search engine) in accordance with one embodiment of the present invention. As shown in FIG. 1, server 110 may comprise search engine code 115 for implementing a process of searching for webpages (e.g., in accordance with 200 of FIG. 2). Server 110 may communicate with one or more computer systems (e.g., 120a, 120b, etc.) via Internet 130 in one embodiment, thereby enabling the search engine code (e.g., 115) to communicate with one or more graphical user interfaces (e.g., 125a of computer system 120a, 125b of computer system 120b, etc.). The graphical user interfaces (e.g., 125a, 125b, etc.) may communicate inputs (e.g., search queries input by a user, commands to initiate a webpage search, etc.) to the search engine code (e.g., 115), and may also display or otherwise present outputs (e.g., results of the webpage search, etc.) received from search engine code. In this manner, the graphical user interfaces (e.g., 125a, 125b, etc.) may implement a graphical user interface (e.g., 1300 of FIGS. 13 and 14) for performing searches of webpages.

Although FIG. 1 shows only two computer systems (e.g., 120a and 120b), it should be appreciated that a larger or smaller number of computer systems may be used in other embodiments. It should also be appreciated that one or more networks, network device, etc. may be coupled to or otherwise used to implement communication between components of system 100 (e.g., server 110, computer system 120a, computer system 120b, etc.). It should also be appreciated that server 110 may communicate with coupled computer systems (e.g., 120a, 120b, etc.) via an intranet (e.g., in place of internet 130, in addition to internet 130, etc.) in one embodiment. Additionally, although only one server (e.g., 110) is depicted in FIG. 1, it should be appreciated that system 100 may comprise a larger number of servers in other embodiments. Further, it should be appreciated that system 100 may comprise additional components (e.g., one or more memories coupled to internet 130 and/or directly to sever 110 for storing search engine code 115, for storing data accessed by server 110 and/or search engine code 115, etc.) in other embodiments.

Figure 2:
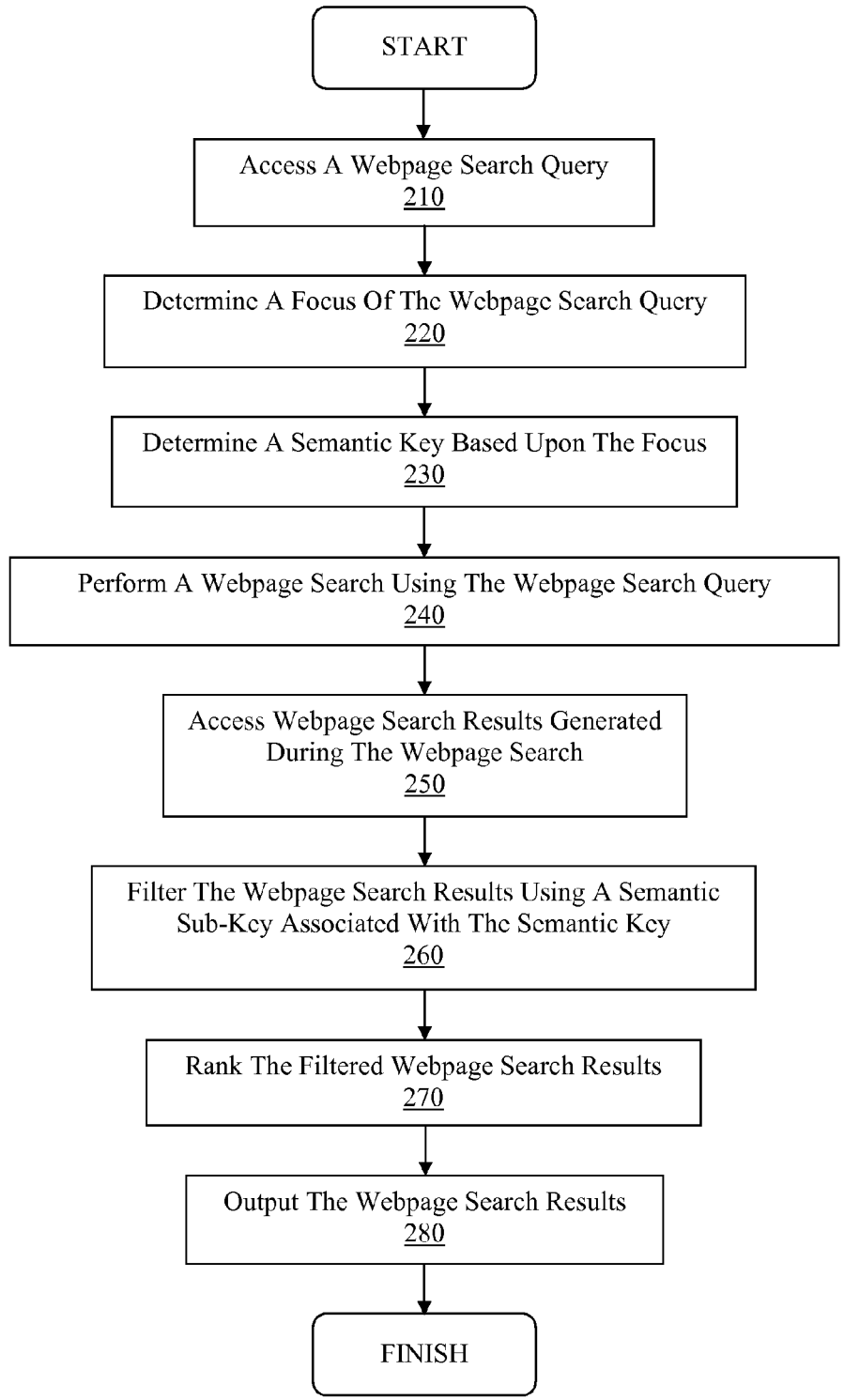
FIG. 2 shows an exemplary flow diagram of a computer-implemented process for performing webpage searches in accordance with one embodiment of the present invention.

FIG. 2 shows an exemplary flow diagram of computer-implemented process 200 for performing webpage searches in accordance with one embodiment of the present invention. As the steps of process 200 are described herein, reference will be made to exemplary data flow diagram 300 of FIG. 3, and to system 100 of FIG. 1, to provide examples and help clarify the discussion.

Figure 3:
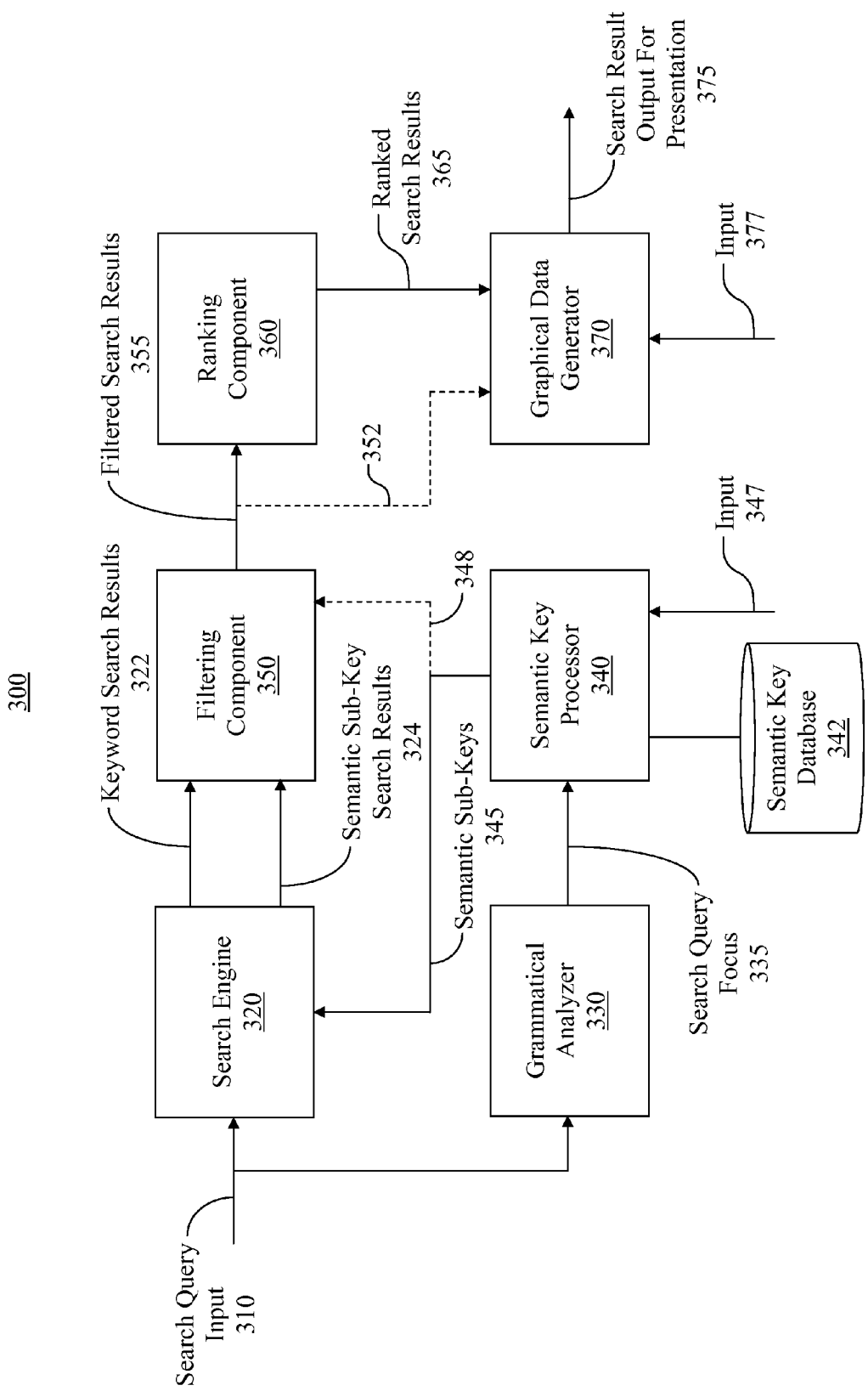
FIG. 3 shows an exemplary data flow diagram of the performance of webpage searches in accordance with one embodiment of the present invention.

Turning briefly to FIG. 3, a broad keyword search may be performed by search engine 320, where the results from the broad keyword search may be subsequently filtered by filtering component 350. Filtering component 350 may filter the search results based upon one or more semantic keys (e.g., accessed from semantic key database 342) determined based upon a focus of the search query (e.g., used by search engine 320 to perform the broad keyword search), where the one or more semantic keys may have at least one associated semantic sub-key. Accordingly, the broad keyword search may provide more complete search results (e.g., omitting fewer relevant search results) which may then be filtered (e.g., by filtering component 350) to reduce the number of irrelevant search results and provide more relevant search results. The search results may then be ranked (e.g., by ranking component 360) in one embodiment, thereby generating ranked search results which are more complete and relevant than those produced by conventional search engines.

As shown in FIG. 2, step 210 involves accessing a webpage search query. The webpage search query (e.g., 310) may be input to a search engine (e.g., 320) in one embodiment. The search query (e.g., 310) may comprise at least one word and/or at least one phrase. Additionally, in one embodiment, the search query (e.g., 310) may comprise at least one operator (e.g., "and," "or," etc.) and/or other data for controlling the search performed by the search engine (e.g., 320).

Step 220 involves determining a focus of the webpage search query. Step 220 may be performed by a grammatical analyzer (e.g., 330) operable to access the search query (e.g., 310) and output a search query focus (e.g., 335) in one embodiment. The focus of the search query may comprise a keyword or phrase of the search query which relates to the information desired by the user inputting the search query. Additionally, where the search query is a question, the focus of the query may comprise a keyword or phrase of the search query which may be used to determine the form and/or content of an answer. For example, if the search query were the question "how tall is the Eiffel Tower," then the focus of the search query may be determined to be the keyword "tall" which relates to a distance. As such, the answer may comprise a distance relating to the height of the Eiffel Tower. As another example, if the search query were the question "which countries border the United States," then the focus of the search query may be determined to be the keyword "countries." As such, the answer may comprise a listing of countries which border the United States.

Figure 4:
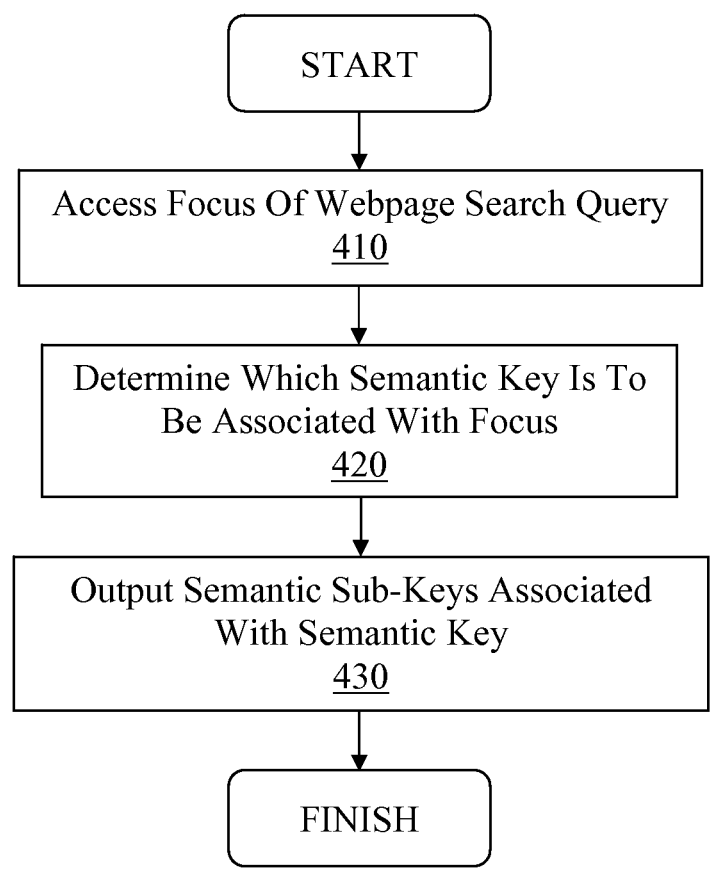
FIG. 4 shows an exemplary flow diagram of a computer-implemented process for determining a semantic key based upon a focus of a search query in accordance with one embodiment of the present invention.

As shown in FIG. 2, step 230 involves determining a semantic key based upon the focus. In one embodiment, step 230 may be performed in accordance with process 400 of FIG. 4. As shown in FIG. 4, step 410 involves accessing a focus (e.g., 335) of a webpage search query (e.g., 310). Step 420 involves determining which semantic key is to be associated with the focus. The semantic key may be determined (e.g., by semantic key generator 340) by comparing the focus (e.g., 335) with possible semantic keys (e.g., stored in semantic key database 342) in one embodiment. Upon finding a match between the focus (e.g., 335) and a semantic key (e.g., 510), or an association between the two, the matched and/or associated semantic key (e.g., 510) may be designated as the semantic key for that focus.

Figure 5:
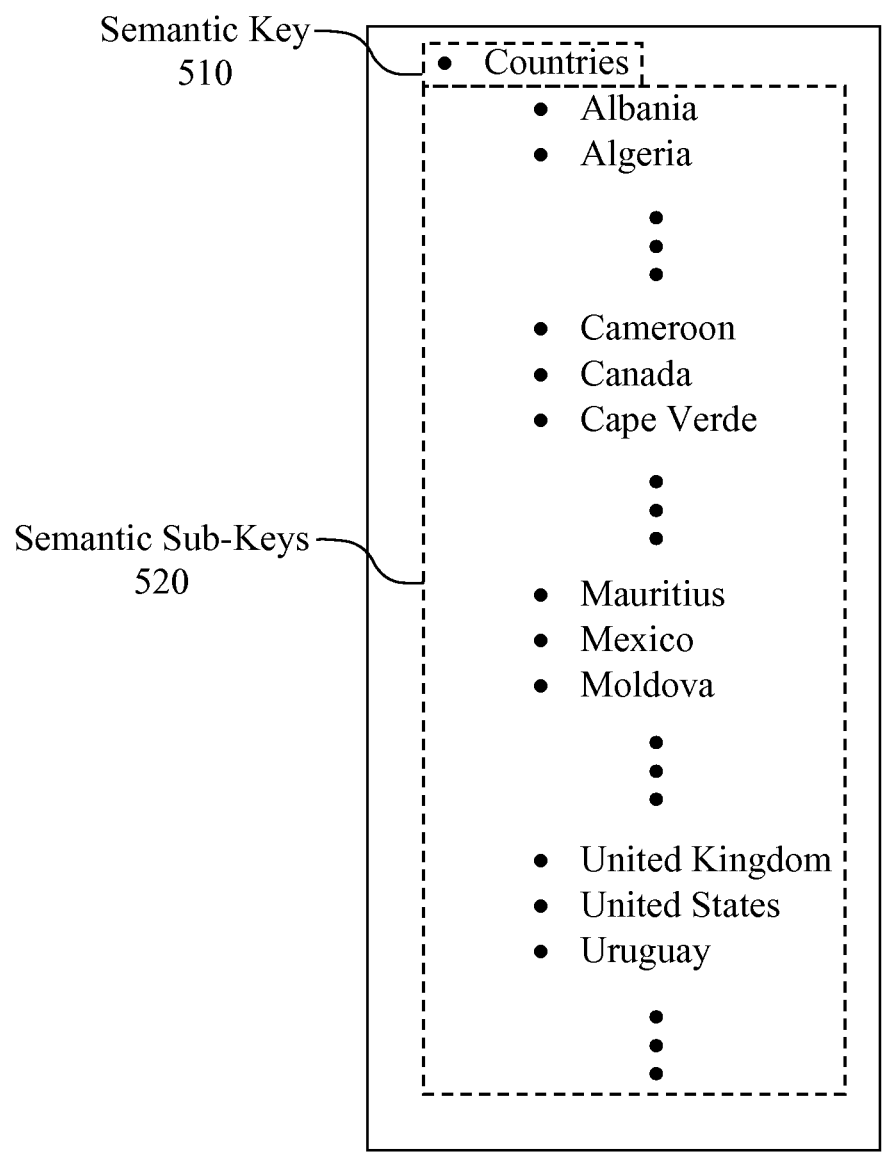
FIG. 5 shows an exemplary organization of semantic sub-keys in accordance with one embodiment of the present invention.

For example, if the focus (e.g., 335) is "country," then a semantic key (e.g., 510 as shown in FIG. 5) associated with a list of countries (e.g., semantic sub-keys 520) may be associated with the focus (e.g., 335). The semantic key (e.g., 510) and/or related semantic sub-keys (e.g., 520) may be organized in a hierarchy with one or more nodes (e.g., semantic key 510 is a superior or parent node, while semantic sub-keys 520 are child nodes of the parent node associated with semantic key 510) in one embodiment. Further, one or more of the semantic sub-keys (e.g., 520) may comprise a hyponym (e.g., semantic key 510 comprises the heading "countries" while semantic sub-keys 520 comprise a listing or index of countries) of a semantic key (e.g., 510).

Figure 6:
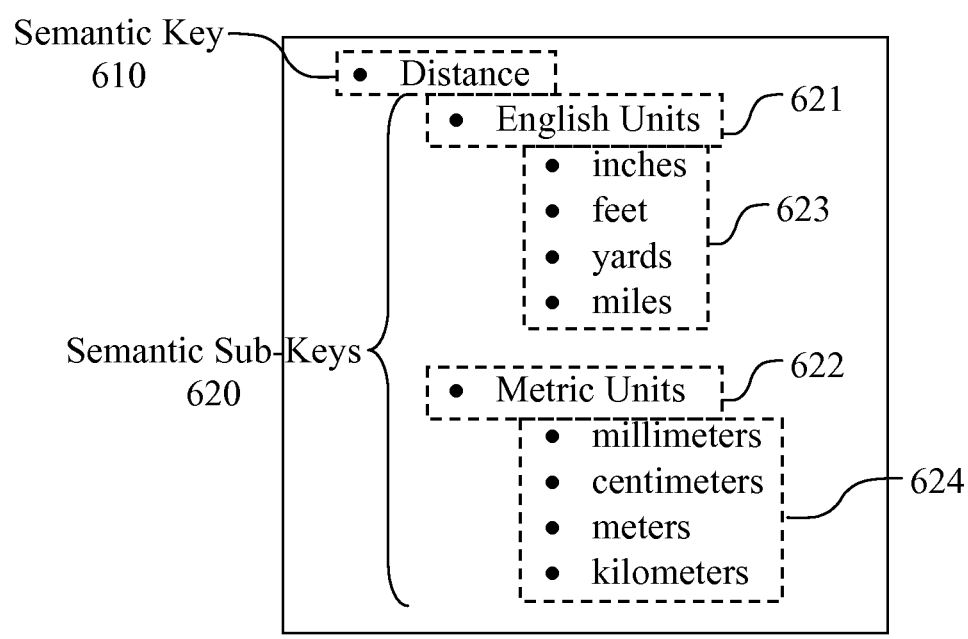
FIG. 6 shows an exemplary organization of semantic sub-keys associated with numerical expressions in accordance with one embodiment of the present invention.

As another example, if the focus (e.g., 335) is "tall," then a semantic key (e.g., 610 as shown in FIG. 6) associated with distance (e.g., semantic sub-keys 620) may be associated with the focus (e.g., 335). The semantic key (e.g., 510) and/or related semantic sub-keys (e.g., 520) may be organized in a hierarchy with one or more nodes (e.g., semantic key 610 is a superior or parent node of semantic sub-keys 620, semantic sub-key 621 is a superior or parent node of semantic sub-keys 623, and semantic sub-key 622 is a superior or parent node of semantic sub-keys 624) in one embodiment. Further, one or more of the semantic sub-keys (e.g., 620) may comprise a hyponym (e.g., semantic key 610 comprises the heading "distance" while semantic sub-keys 620 comprise different units of distance) of a semantic key (e.g., 610).

As shown in FIG. 4, step 430 involves outputting semantic sub-keys (e.g., 520, 620, etc.) associated with the semantic key (e.g., 510, 610, etc.) determined in step 420. The semantic sub-keys (e.g., 345) may be output by a semantic key generator (e.g., 340) as shown in FIG. 3. Additionally, in one embodiment, semantic sub-keys 345 may comprise one or more of semantic sub-keys 520 and/or 620 (e.g., depending upon the at least one respective semantic key assigned to the focus (e.g., 335) of the search query (e.g., 310).

The semantic sub-keys (e.g., 345) output by the semantic key processor (e.g., 340) may be controlled by input 347 in one embodiment. Input 347 may comprise a user input, system-generated input, etc. For example, inputs 347 may select at least one semantic key (e.g., 510, 610, etc.) and/or at least one semantic sub-key (e.g., 345, 520, 620, etc.) for output by semantic key processor 340, where the selection of the semantic sub-keys may be input to a graphical user interface (e.g., 125a, 125b, etc.) in one embodiment. As such, inputs 347 may enable a user to configure and/or refine the search query (e.g., 310) in one embodiment, thereby further enabling a user to configure or refine the searches performed by search engine 320 as discussed below.

Turning back to FIG. 2, step 240 involves performing a webpage search using the webpage search query (e.g., accessed in step 210). The webpage search may comprise a keyword search (e.g., based upon one or more keywords of the search query). And in one embodiment, the webpage search may comprise a keyword search of any well-known fashion. Additionally, the search may be performed by a search engine (e.g., 320) operable to access the search query (e.g., 310) and output search results (e.g., keyword search results 322). In one embodiment, the webpage search may be performed by any well-known, keyword-based search engine. The search engine (e.g., 322) may be implemented by search engine code (e.g., 115 of FIG. 1), and the search query (e.g., 310) may be input to a graphical user interface (e.g., 125a, 125b, etc.) and communicated to a computer system (e.g., server 110) which accesses and/or executes the search engine code (e.g., 115).

Step 250 involves accessing the webpage search results generated during the webpage search (e.g., performed in step 240). The webpage search results (e.g., keyword search results 322) may be accessed by a filtering component (e.g., 350) in one embodiment.

Figure 7A:
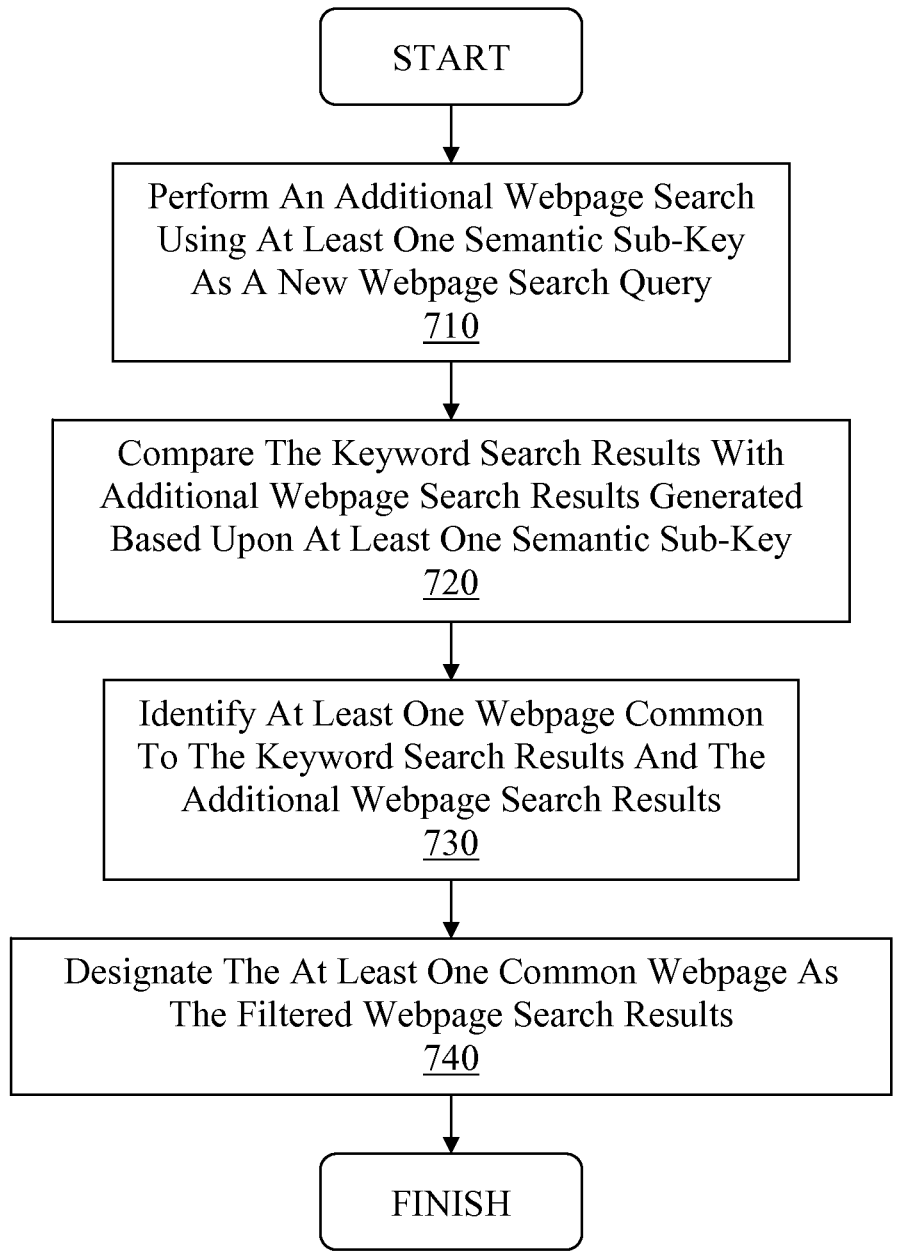
FIG. 7A shows an exemplary flow diagram of a computer-implemented process for filtering webpage search results in accordance with one embodiment of the present invention.

As shown in FIG. 2, step 260 involves filtering the webpage search results (e.g., 322) using a semantic sub-key (e.g., 345, 520, 620, etc.) associated with the semantic key (e.g., determined in step 230). In one embodiment, step 260 may be performed in accordance with process 700 of FIG. 7A. As shown in FIG. 7A, step 710 involves performing an additional webpage search using at least one semantic sub-key (e.g., 345, 520, 620, etc.) as a new webpage search query. The additional webpage search may be performed by a search engine (e.g., 320) operable to access the at least one semantic sub-key (e.g., 345, 520, 620, etc.) and generate the additional webpage search results (e.g., semantic sub-key search results 324).

Keyword search results (e.g., 322) may be compared with the additional webpage search results (e.g., 324) generated based upon the at least one semantic sub-key (e.g., 345, 520, 620, etc.). Step 730 involves identifying at least one webpage common to the keyword search results (e.g., 322) and the additional webpage search results (e.g., 324). Steps 720 and 730 may be performed by a filtering component (e.g., 350) operable to access the keyword search results (e.g., 322) and the additional webpage search results (e.g., 324) in one embodiment.

As shown in FIG. 7A, step 740 involves designating the at least one common webpage as the filtered webpage search results (e.g., those generated as a result of the filtering in step 260). In one embodiment, the filtered webpage search results (e.g., 355) may be output by a filtering component (e.g., 350). In this manner, embodiments may filter irrelevant webpages (e.g., those not comprising at least one semantic sub-key) from the search results (e.g., 355), while maintaining the relevant webpages (e.g., those which comprise at least one semantic sub-key).

Although the filtering performed in step 260 has been described in terms of the steps of exemplary process 700, it should be appreciated that other filtering mechanisms may be performed in other embodiments. For example, each webpage of the results of the keyword search (e.g., 322) may be searched for the semantic sub-keys (e.g., 345, 520, 620, etc.). If a webpage does not contain at least one of the semantic sub-keys (e.g., 345, 520, 620, etc.), then the webpage may be discarded or excluded from the filtered webpage search results (e.g., 355) in one embodiment. In this manner, the filtered webpage search results (e.g., 355) may comprise webpages which contain at least one of the semantic sub-keys (e.g., 345, 520, 620, etc.). Alternatively, other filtering mechanisms may be used in other embodiments to strip irrelevant webpages (e.g., those not intended or desired by search query 310) while maintaining relevant webpages (e.g., those intended or desired by search query 310).

Figure 7B:
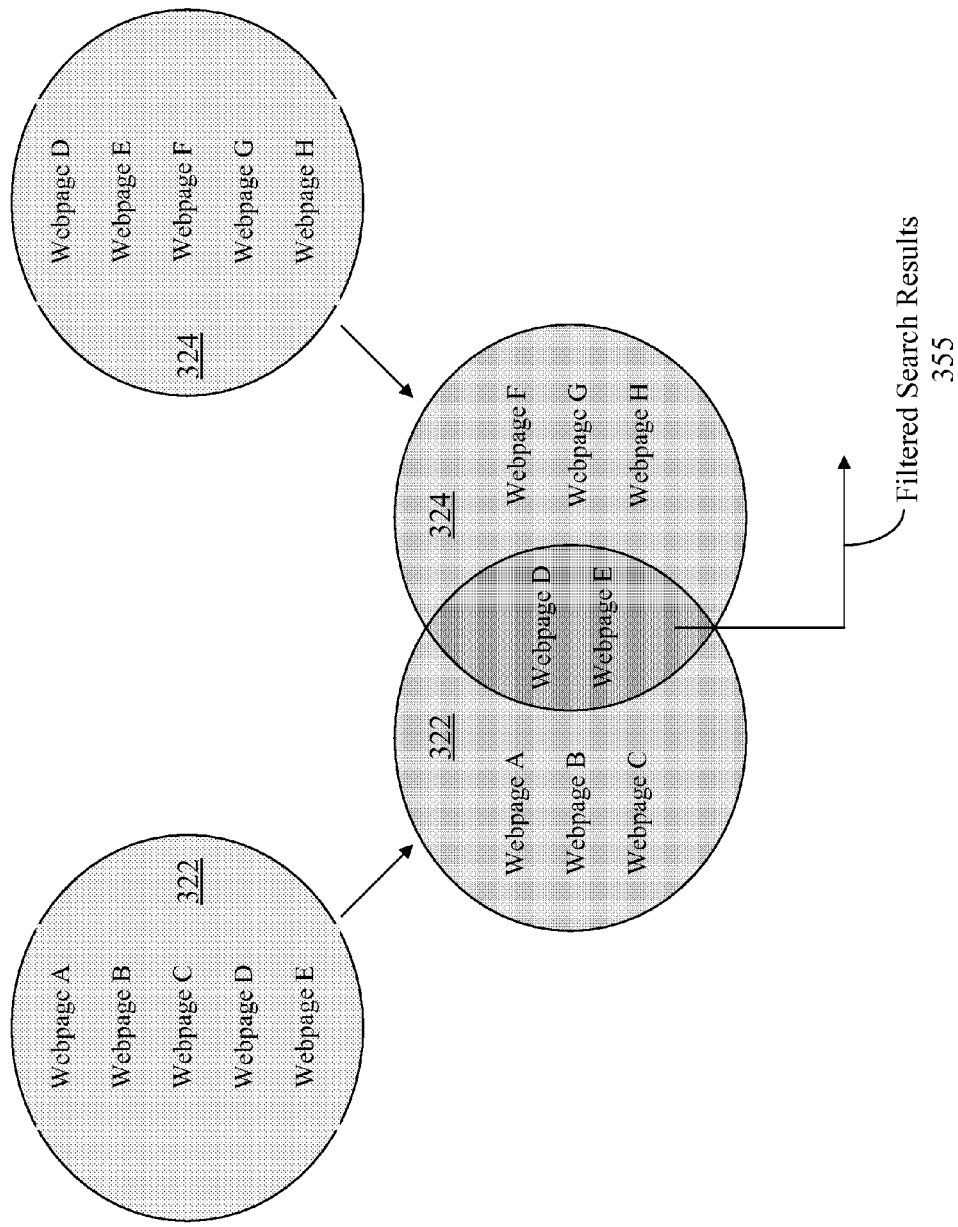
FIG. 7B shows an exemplary block diagram depicting a webpage search filtering mechanism in accordance with one embodiment of the present invention.

FIG. 7B shows exemplary block diagram 750 depicting a webpage search filtering mechanism in accordance with one embodiment of the present invention. As shown in FIG. 7B, search results 322 may comprise webpages A through E, while search results 324 comprise webpages D through H. In one embodiment, keyword search results 322 may include webpages identified, located, etc. in response to a keyword search. Additionally, semantic sub-key search results 324 may include webpages identified, located, etc. in response to a webpage search with a search query including one or more semantic sub-keys (e.g., 345, 520, 620, etc.).

Search results 322 may then be filtered by comparing search results 322 and 324 (e.g., as described in step 720 of process 700 of FIG. 7A) and identifying at least one webpage shared by both search results 322 and 324 (e.g., as described in step 730 of process 700 of FIG. 7A). As depicted in FIG. 7B, the comparison of search results 322 with search results 324 may be depicted by the overlapping of the search results (e.g., 322 and 324). The overlapped area (e.g., comprising webpage D and E) may indicate that webpages D and E are members of both search results 322 and search results 324. Once the webpages (e.g., webpages D and E) shared by both search results 322 and 324 are identified, they may be designated as filtered search results 355 (e.g., as described with respect to step 740 of process 700 of FIG. 7A).

It should be appreciated that search results 322 and/or search results 324 may comprise an aggregation of one or more subsets of search results. For example, where multiple semantic sub-key searches are performed (e.g., where a semantic key associated with focus 335 of search query 310 has more than one semantic sub-key 345 associated therewith), the search results from each search may be combined. For example, search results 324 may comprise search results from a first semantic sub-key search (e.g., using a first semantic sub-key as the search query), search results from a second semantic sub-key search (e.g., using a second semantic sub-key as the search query), and search results from a third semantic sub-key search (e.g., using a third semantic sub-key as the search query). In other embodiments, a larger or smaller number of search results may be combined to form search results 324. In this manner, each webpage of the output search results (e.g., 355) may comprise at least one semantic sub-key (e.g., 345, 520, 620, etc.), thereby increasing the number of relevant results given the association (e.g., via the semantic key) of the semantic sub-key (e.g., 345) to the focus (e.g., 355) of the search query (e.g., 310).

Figure 8A:
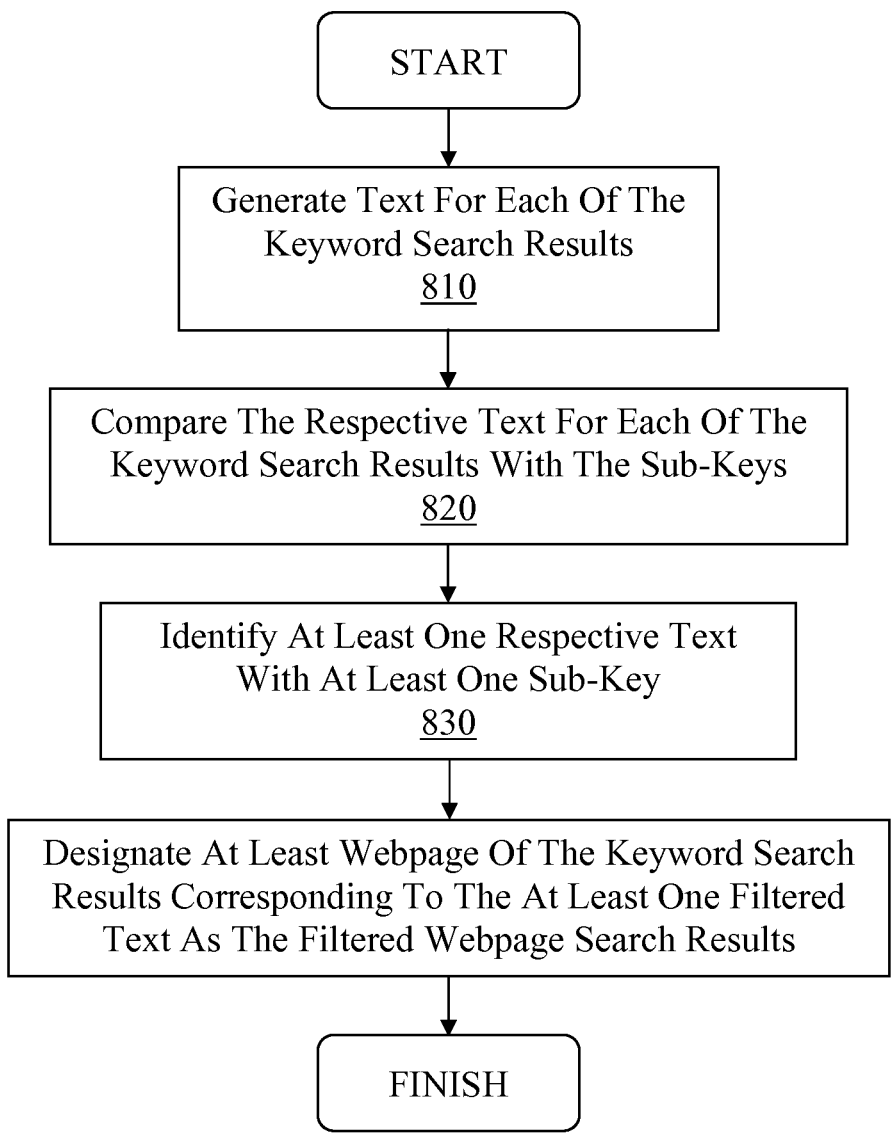
FIG. 8A shows an exemplary flow diagram of a computer-implemented process for filtering webpage search results using text generated from keyword search results in accordance with one embodiment of the present invention.
Figure 8B:
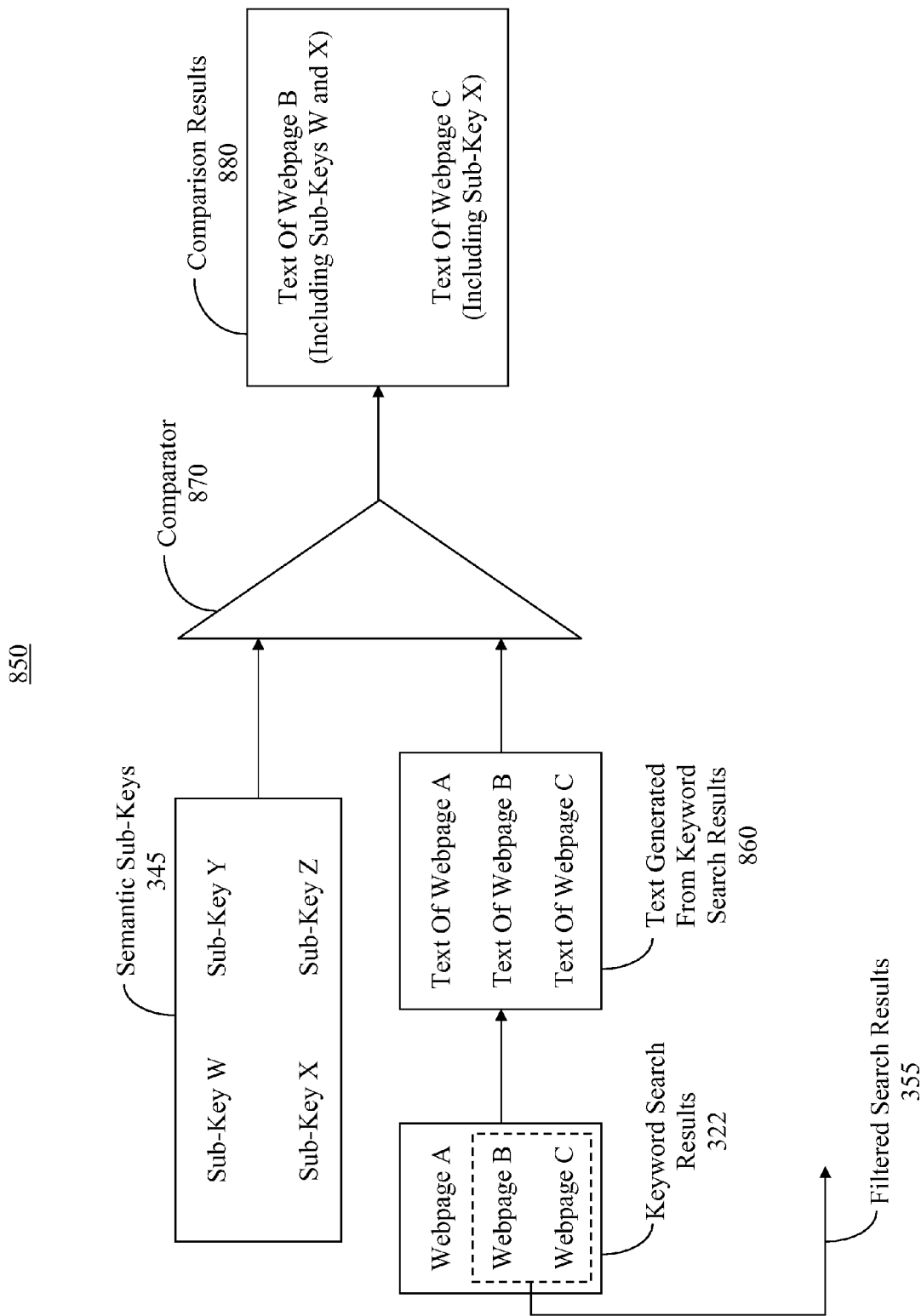
FIG. 8B shows an exemplary block diagram depicting a webpage search filtering mechanism using text generated from keyword search results in accordance with one embodiment of the present invention.

Turning back to FIG. 2, step 260 may be performed in accordance with process 800 of FIG. 8A in one embodiment. FIG. 8B will be described in conjunction with FIG. 8A below.

As shown in FIG. 8A, step 810 involves generating text for each of the keyword search results (e.g., 322). The text (e.g., 860) may be generated by a filtering component (e.g., 350) in one embodiment. Additionally, the text (e.g., 860) may comprise a title of the at least one webpage of the keyword search results (e.g., 322), portions of the bodies or content of the at least one webpage of the keyword search results (e.g., 322), an identifier or other reference to the at least one webpage of the keyword search results (e.g., 322), some combination thereof, etc. For example, as shown in FIG. 8B, text 860 may include text for each of webpages A through C of keyword search results 322.

Step 820 involves comparing the respective text for each of the keyword search results with the sub-keys. For example, as shown in FIG. 8B, semantic sub-keys 345 may include sub-keys W through Z which may be compared (e.g., by comparator 870) to the text (e.g., 860) generated based from the keyword search results (e.g., 322). Comparator 870 may be implemented by filtering component 350 (e.g., which accesses semantic sub-keys 345 from semantic key processor 340 as depicted in FIG. 3 by dashed arrow 348) in one embodiment. The comparison may involve searching text 860 for each of sub-keys 345 individually (e.g., search text 860 for sub-key W, then search text 860 for sub-key X, etc.) until a match is found, or alternatively, may involve searching text 860 for each of sub-keys 345 in parallel (e.g., search text 860 for sub-key W through Z at the same time) to determine if a match is found. Additionally, the comparison may be a text-to-text comparison where sub-keys 345 are text.

As shown in FIG. 8A, step 830 involves identifying at least one respective text (e.g., corresponding to one or more webpages of keyword search results 322) with at least one sub-key (e.g., 345). For example, as shown in FIG. 8B, comparison results 880 (e.g., output by comparator 870) may include text associated with webpages B and C, where the text of webpage B includes sub-keys W and X and the text of webpage C includes sub-key X. The text of webpage A may not include any of sub-keys W through Z in one embodiment, and therefore, may not be included in comparison results 880. Thus, the text corresponding to webpages B and C may be identified (e.g., by comparison results 880) in step 830.

Step 840 involves designating at least one webpage of the keyword search results corresponding to the at least one filtered text as the filtered webpage search results. For example, as shown in FIG. 8B, where comparison results 880 include text for webpages B and C, then webpages B and C from keyword search results 322 may be designated as the filtered search results (e.g., 355).

And in one embodiment, step 840 may include prioritizing or otherwise ranking the designated webpages (e.g., related to or identified using comparison results 880) above other webpages of keyword search results 322 which do not include one or more of sub-keys 345. In this manner, step 840 may implement a pre-ranking step (e.g., performed before ranking in step 270 of FIG. 2). For example, referring to FIG. 8B, webpages B and C (which include one or more sub-keys 345) may be ranked ahead of webpage A (which does not include at least one of sub-keys 345). Thus, filtered search results 355 may include even webpages without at least one semantic sub-key 345 in one embodiment.

Turning back to FIG. 2, step 270 involves ranking the filtered webpage search results (e.g., 355). The filtered search results (e.g., 355) may be ranked by a ranking component (e.g., 360 of FIG. 3), thereby generating ranked search results (e.g., 365), in one embodiment. Additionally, in one embodiment, step 270 may be performed in accordance with one or more of exemplary processes 900-1100 of FIGS. 9-11, respectively.

Figure 9:
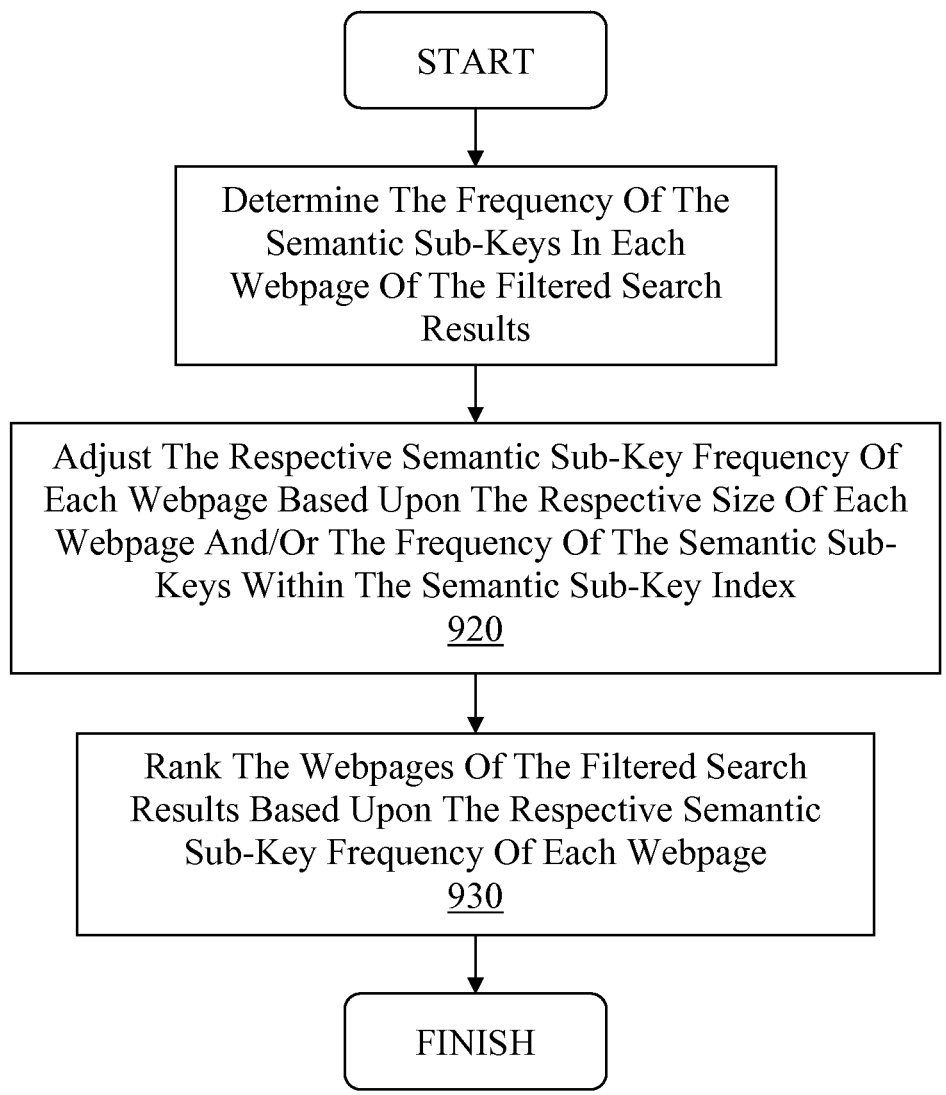
FIG. 9 shows an exemplary flow diagram of a computer-implemented process for ranking webpage search results in accordance with a semantic sub-key frequency in accordance with one embodiment of the present invention.

FIG. 9 shows an exemplary flow diagram of computer-implemented process 900 for ranking webpage search results in accordance with a semantic sub-key frequency in accordance with one embodiment of the present invention. As shown in FIG. 9, step 910 involves determining the frequency of the semantic sub-keys in each webpage of the filtered search results (e.g., 355). In one embodiment, the semantic sub-key frequency for each webpage may be determined based upon the total number of instances of all semantic sub-keys (e.g., 245, 520, 620, etc.) of each webpage of the search results (e.g., 355). For example, if webpage X comprises 30 instances of semantic sub-key 1 and 40 instances of semantic sub-key 2, then the semantic sub-key frequency for webpage X may be 70 (e.g., the sum of 30 and 40) in one embodiment. Alternatively, the semantic sub-key frequency for each webpage may be determined based upon the number of instances of one or more selected semantic sub-keys (e.g., 245, 520, 620, etc.) of each webpage of the search results (e.g., 355). For example, the semantic sub-key frequency for webpage X may be 30 if semantic sub-key 1 is used to determine the semantic sub-key frequency. Alternatively, the semantic sub-key frequency for webpage X may be 40 if semantic sub-key 2 is used to determine the semantic sub-key frequency.

Step 920 involves adjusting the respective semantic sub-key frequency of each webpage based upon the respective size of each webpage and/or the frequency of the semantic sub-keys within the semantic sub-key index (e.g., stored within semantic key database 342). For example, the semantic sub-key frequency for each webpage of the search results may be scaled (e.g., divided) by a factor associated with its respective webpage size (e.g., number of words, number of lines, frame size, etc.) in one embodiment. Alternatively, the semantic sub-key frequency for each webpage of the search results may be scaled by the frequency of its respective semantic sub-key (e.g., the semantic sub-key used to produce the search results comprising the webpage) within the semantic sub-key index (e.g., the collection of semantic sub-keys associated with a given semantic key). For example, if a semantic sub-key appears three times within a given semantic sub-key index (e.g., each instance under a different sub-node within the index associated with a semantic key), then the semantic sub-key frequency for each webpage search result associated with that semantic sub-key may be scaled (e.g., divided) by a factor (e.g., three) associated with the frequency of the semantic sub-key within the semantic sub-key index. And in other embodiments, step 920 may be omitted.

As shown in FIG. 9, step 930 involves ranking the webpages of the filtered search results based upon the respective semantic sub-key frequency of each webpage. For example, if webpage X has a semantic sub-key frequency (e.g., non-scaled as determined in step 910 and/or scaled as determined in step 920) of 70, while webpage Y has a semantic sub-key frequency of 80, then webpage Y may be ranked ahead of webpage X in one embodiment. In this case, a higher semantic sub-key frequency of webpage Y may indicate that webpage Y is more relevant to the search query (e.g., 310) than webpage X in one embodiment, hence the higher ranking of webpage Y with respect to webpage X.

Figure 10:
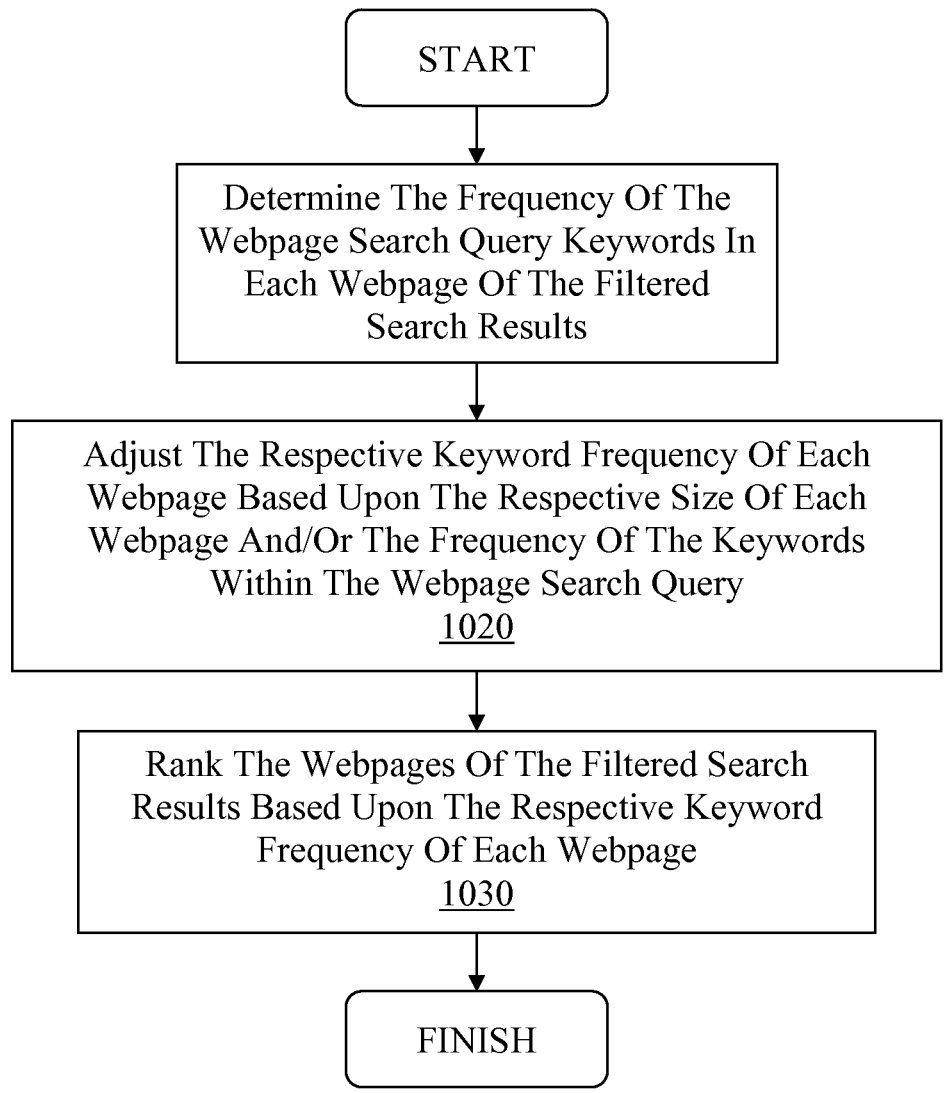
FIG. 10 shows an exemplary flow diagram of a computer-implemented process for ranking webpage search results in accordance with a keyword frequency in accordance with one embodiment of the present invention.

FIG. 10 shows an exemplary flow diagram of computer-implemented process 1000 for ranking webpage search results in accordance with a keyword frequency in accordance with one embodiment of the present invention. As shown in FIG. 10, step 1010 involves determining the frequency of the webpage search query keywords (e.g., of search query 310) in each webpage of the filtered search results (e.g., 355). In one embodiment, the keyword frequency for each webpage may be determined based upon the total number of instances of all search query keywords of each webpage of the search results (e.g., 355). For example, if webpage X comprises 10 instances of keyword 1 and 50 instances of keyword 2, then the keyword frequency for webpage X may be 60 (e.g., the sum of 10 and 50) in one embodiment. Alternatively, the keyword frequency for each webpage may be determined based upon the number of instances of one or more selected search query keywords of each webpage of the search results (e.g., 355). For example, the keyword frequency for webpage X may be 10 if keyword 1 is used to determine the keyword frequency. Alternatively, the keyword frequency for webpage X may be 50 if keyword 2 is used to determine the keyword frequency.

Step 1020 involves adjusting the respective keyword frequency of each webpage based upon the respective size of each webpage and/or the frequency of one or more keywords within the search query (e.g., 310). For example, the keyword frequency for each webpage of the search results may be scaled (e.g., divided) by a factor associated with its respective webpage size (e.g., number of words, number of lines, frame size, etc.) in one embodiment. Alternatively, the keyword frequency for each webpage of the search results may be scaled by the frequency of one or more keywords within the search query. For example, if a keyword appears three times within the search query, then the keyword frequency for each webpage search result comprising the keyword may be scaled (e.g., divided) by a factor (e.g., three) associated with the frequency of the keyword within the search query (e.g., 310). And in other embodiments, step 1020 may be omitted.

As shown in FIG. 10, step 1030 involves ranking the webpages of the filtered search results based upon the respective keyword frequency of each webpage. For example, if webpage X has a keyword frequency (e.g., non-scaled as determined in step 1010 and/or scaled as determined in step 1020) of 60, while webpage Y has a keyword frequency of 90, then webpage Y may be ranked ahead of webpage X in one embodiment. In this case, a higher keyword frequency of webpage Y may indicate that webpage Y is more relevant to the search query (e.g., 310) than webpage X in one embodiment, hence the higher ranking of webpage Y with respect to webpage X.

Figure 11:
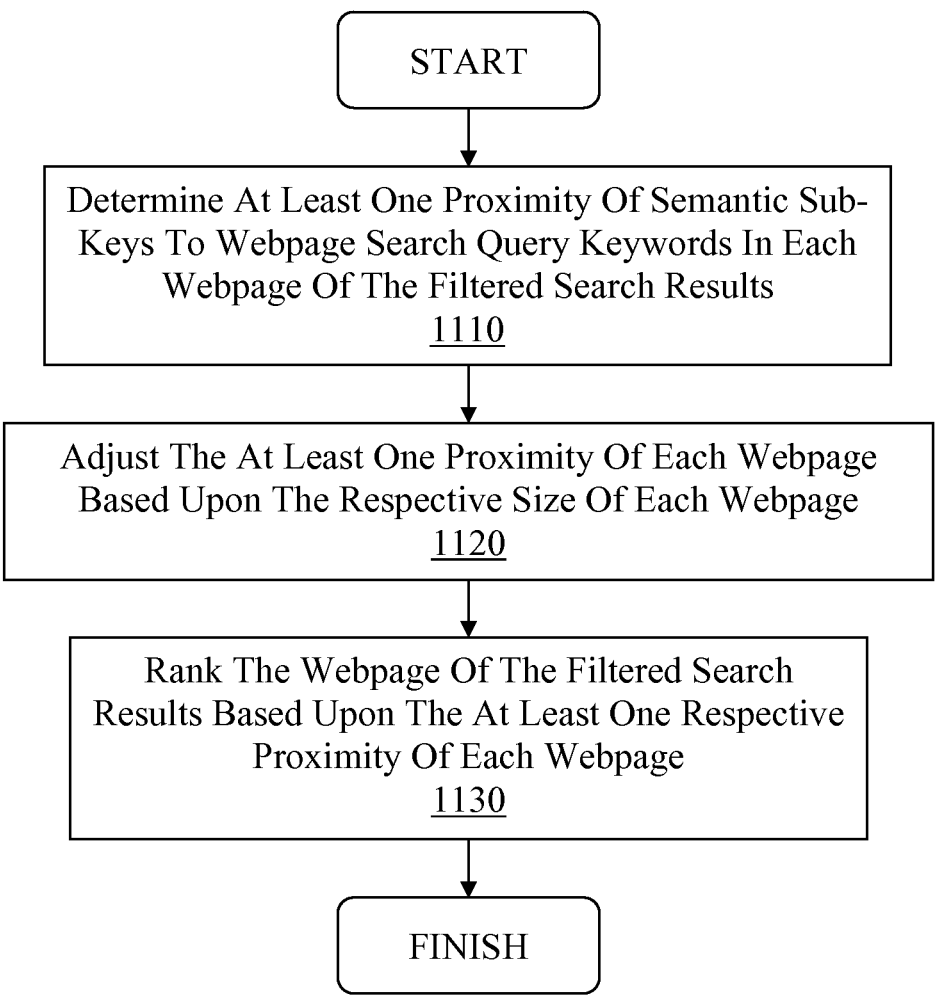
FIG. 11 shows an exemplary flow diagram of a computer-implemented process for ranking webpage search results in accordance with a proximity of semantic sub-keys and search query keywords in accordance with one embodiment of the present invention.

FIG. 11 shows an exemplary flow diagram of computer-implemented process 1100 for ranking webpage search results in accordance with a proximity of semantic sub-keys and search query keywords in accordance with one embodiment of the present invention. As shown in FIG. 11, step 1110 involves determining at least one proximity of semantic sub-keys (e.g., 345, 520, 620, etc.) to webpage search query keywords in each webpage of the filtered search results (e.g., 355). In one embodiment, the proximity may be determined by calculating the "distance" or other measure of proximity between two semantic sub-keys, between two keywords, between a semantic sub-key and a keyword, some combination thereof, etc. The measure of proximity may be determined based upon a sequential word ordering as discussed with respect to FIG. 12 in one embodiment.

FIG. 12 shows exemplary word sequential ordering 1200 of webpage content which may be used to determine proximity between two portions of the webpage in accordance with one embodiment of the present invention. As shown in FIG. 12, row 1210 comprises a sequential ordering of the words of the webpage, row 1220 comprises semantic sub-keys (e.g., S1 and S2) and keywords (e.g., K1 and K2) associated with one or more respective words of the webpage, and rows 1230 comprise four "hotspots" representing a collection of localized semantic sub-keys and/or keywords for which a proximity is determined. In one embodiment, a hotspot may comprise all of the semantic sub-keys (e.g., S1 and S2) and all of the keywords (e.g., K1 and K2) found in the webpage. In other embodiments, a hotspot may comprise less than all of the semantic sub-keys and/or keywords found in the webpage. Additionally, in one embodiment, multiple overlapping hotspots may be assigned a single proximity (e.g., equal to largest proximity of each individual overlapping hotspot, equal to smallest proximity of each individual overlapping hotspot, etc.).

The proximity for a given hotspot may be calculated by the number of word which the hotspot spans. For example, hotspot 1 may comprise a proximity of 5 (e.g., since it spans from word 2 to word 6), hotspot 2 may comprise a proximity of 4 (e.g., since it spans from word 4 to word 7), hotspot 3 may comprise a proximity of 5 (e.g., since it spans from word 42 to word 46), and hotspot 4 may comprise a proximity of 6 (e.g., since it spans from word 82 to word 87). In one embodiment, a single proximity (e.g., the highest proximity, the lowest proximity, an average proximity, etc.) may be assigned to each webpage in step 1110.

As shown in FIG. 11, step 1120 involves adjusting the at least one proximity of each webpage based upon the respective size of each webpage. For example, the proximity for each webpage of the search results may be scaled (e.g., divided) by a factor associated with its respective webpage size (e.g., number of words, number of lines, frame size, etc.) in one embodiment. Additionally, in one embodiment, a single proximity (e.g., the highest scaled proximity, the lowest scaled proximity, an average scaled proximity, etc.) may be assigned to each webpage in step 1120 (e.g., if a single proximity was not selected for each webpage in step 1110).

Step 1130 involves ranking the webpages of the filtered search results based upon the at least one respective proximity of each webpage. For example, if webpage X has a proximity (e.g., non-scaled as determined in step 1110 and/or scaled as determined in step 1120) of 6, while webpage Y has a proximity of 4, then webpage Y may be ranked ahead of webpage X in one embodiment. In this case, a lower proximity of webpage Y may indicate that webpage Y is more relevant to the search query (e.g., 310) than webpage X in one embodiment, hence the higher ranking of webpage Y with respect to webpage X.

Turning back to FIG. 2, step 280 involves outputting the webpage search results. The search results output in step 280 may comprise filtered search results (e.g., accessed from filtering component 350 without ranking as depicted by arrow 352 of FIG. 3) or ranked search results (e.g., accessed from ranking component 360). Additionally, in one embodiment, the outputting performed in step 280 may comprise outputting graphical data (e.g., search result output for presentation 275 generated by graphical data generator 370) based upon the search results (e.g., 355 or 365). For example, the search results may be transformed (e.g., by graphical data generator 370) into a format (e.g., C, C++, Java, HTML, etc.) operable to be displayed by a computer system application (e.g., a web browser, etc.), where the displayed information may comprise a graphical user interface (e.g., 125a, 125b, 1300, etc.) in one embodiment.

As shown in FIG. 3, the search result output (e.g., 375) may be configured or controlled by input 377, where input 377 may comprise a user input, system-generated input, etc. In one embodiment, information associated with one or more webpages of the search results (e.g., 355, 365, etc.) may be hidden or not displayed in response to input 377. For example, input 377 may comprise a selection of at least one semantic key and/or at least one semantic sub-key, where information associated with a selected semantic key and/or semantic sub-key may be included in output 372 for display, while information associated with a non-selected semantic key and/or semantic sub-key may be excluded from output 372 (e.g., for effectively hiding or not displaying that information).

Figure 13:
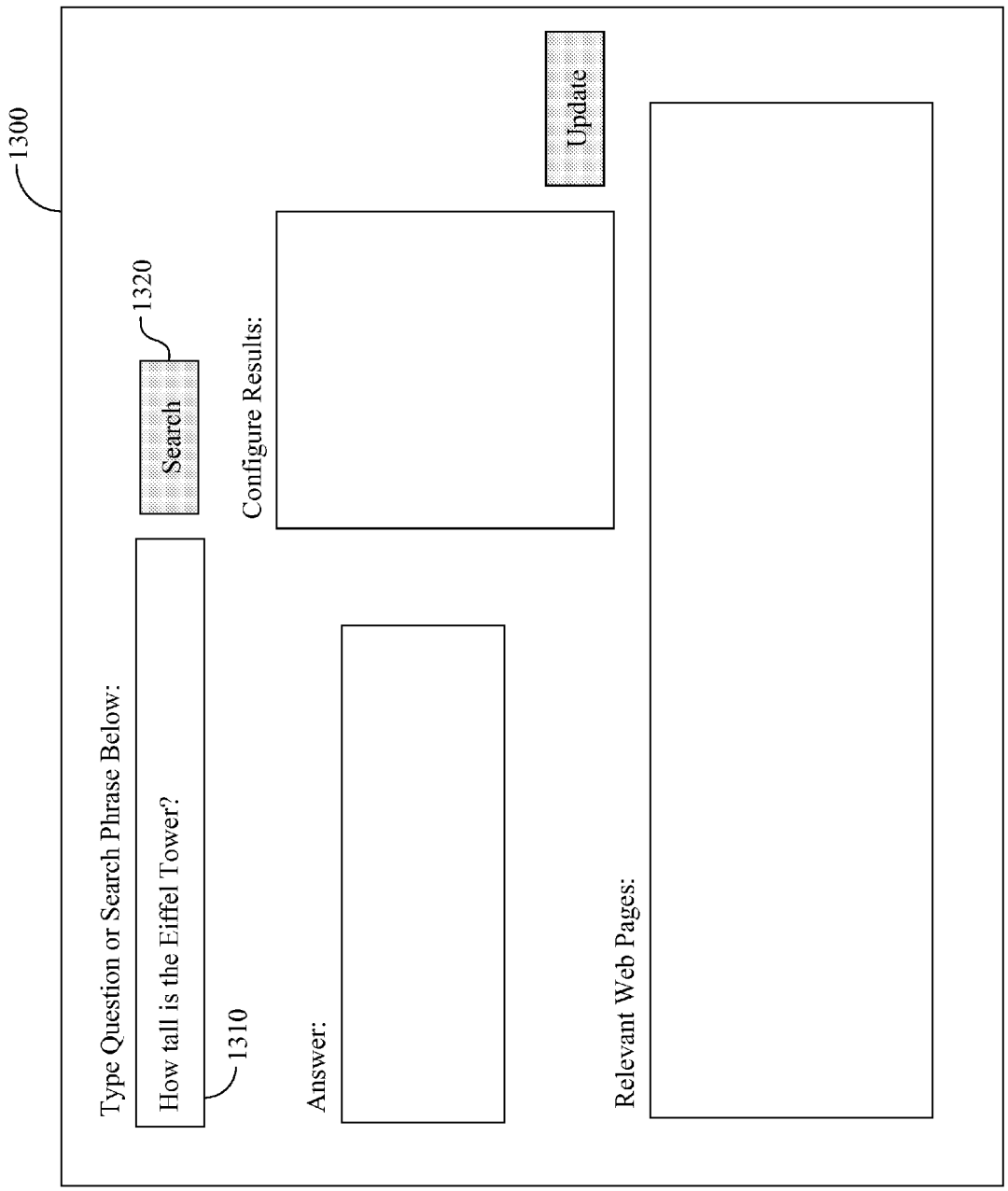
FIG. 13 shows an exemplary on-screen graphical user interface for performing webpage searches in accordance with one embodiment of the present invention.

FIG. 13 shows exemplary on-screen graphical user interface (GUI) 1300 for performing webpage searches in accordance with one embodiment of the present invention. As shown in FIG. 13, GUI 1300 may comprise region 1310 for entering search queries. For example, a user may enter the following search query (e.g., 310) as depicted in FIG. 13: "How tall is the Eiffel Tower?" The search query may comprise a question. Alternatively, the search query may comprise a series of keywords and/or phrases. Additionally, in one embodiment, the search query (e.g., 310) entered into region 1310 may comprise at least one operator (e.g., "and," "or," etc.) and/or other data for controlling the search performed by the search engine (e.g., 320).

GUI 1300 may also comprise graphical object 1320 for initiating a webpage search based upon the search query (e.g., 310) entered into region 1310. In response to interaction (e.g., moving a mouse pointer or cursor over graphical object 1320 and clicking a button on the mouse) with graphical object 1320, the webpage search may be conducted and results of the search may be displayed in other regions of GUI 1300 (e.g., as depicted in FIG. 14).

Figure 14:
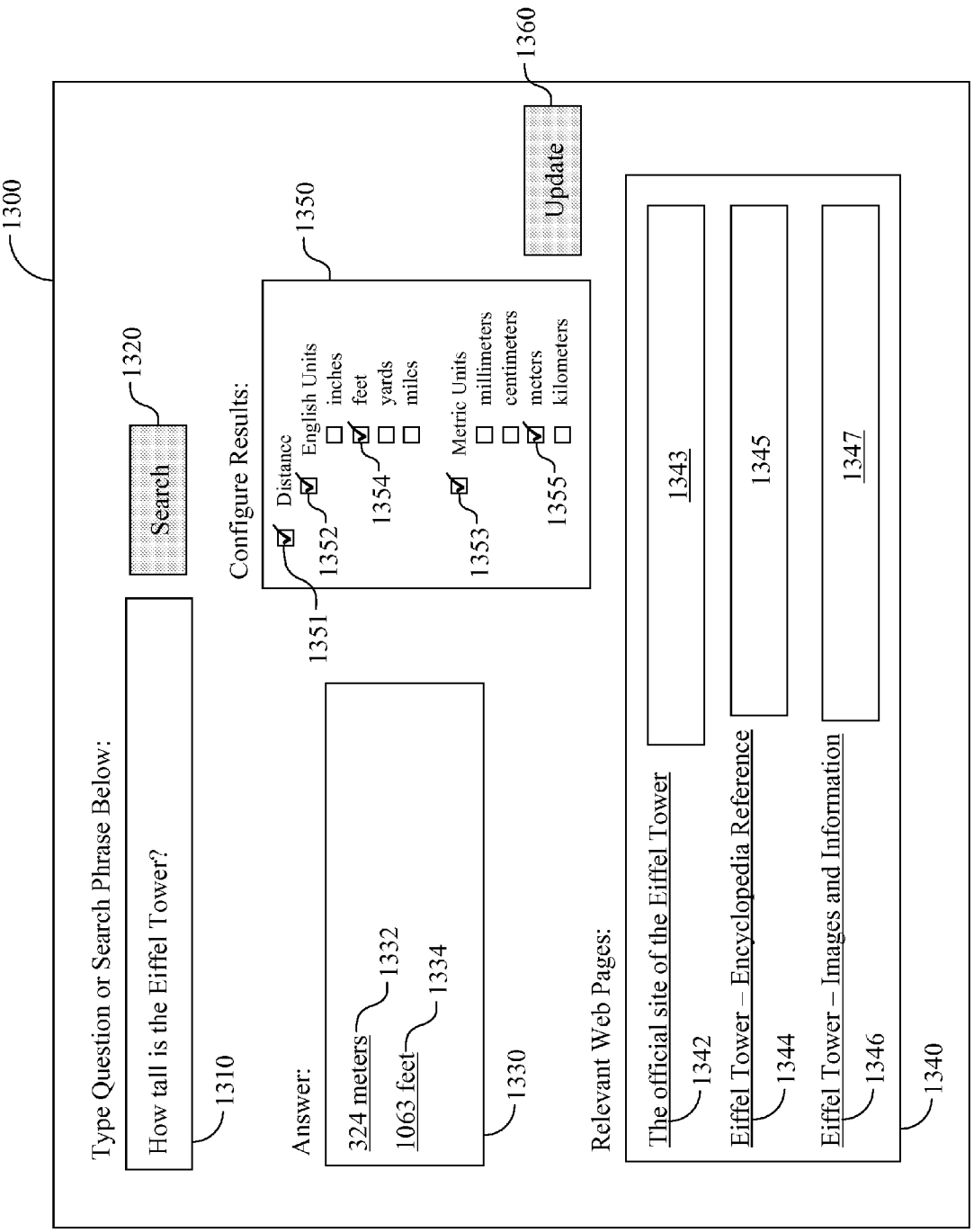
FIG. 14 shows an exemplary on-screen graphical user interface for performing webpage searches with search results displayed in accordance with one embodiment of the present invention.

FIG. 14 shows exemplary on-screen GUI 1300 for performing webpage searches with search results displayed in accordance with one embodiment of the present invention. As shown in FIG. 14, region 1330 may display a portion of search result output 375 comprising one or more answers (e.g., 1332 and 1334) to a question entered in region 1310. The answer may comprise a first portion which comprises a numerical value (e.g., 324, 1063, etc.) extracted from one or more of the webpages of the search results (e.g., 355, 365, etc.). Additionally, the answer may comprise a second portion (e.g., the units "meters" and "feet") which may correspond to the first portion. The second portion may also be associated with a semantic sub-key (e.g., 345, 520, 620, etc.). Further, in one embodiment, the first portion may be derived from a webpage of the search results (e.g., 355, 365, etc.) associated with the semantic sub-key (e.g., which is also associated with the second portion).

In one embodiment, where the focus (e.g., 335) of a search query (e.g., 310) relates to a number (e.g., relating to distance, height, etc.), then it may be determined that the answer (e.g., displayed in region 1330) may comprise a number (e.g., forming the first portion of the answer). As such, one or more numbers (e.g., 324, 1063, etc.) may be extracted from the search results (e.g., 355, 365, etc.) and paired with an appropriate modifier (e.g., related to a semantic sub-key used to filter and/or generate the search results). The number may be located in close proximity to the modifier or the semantic sub-key corresponding thereto (e.g., determined by a sequential word ordering as discussed with respect to FIG. 12). For example, if the number "1063" is commonly found in the search results (e.g., related to the Eiffel Tower) within a few words of the word "feet," then the number "1063" may be selected to be paired with the modifier "feet" for display in region 1330. Additionally, where multiple numbers are found in the search results near a modifier or a semantic sub-key corresponding thereto, then the more frequently occurring number may be selected to be paired with the modifier and displayed in region 1330.

As a further example, the search query (e.g., 310) entered in region 1310 may comprise the following question: "Which countries border the United States?" The focus (e.g., 335) of the search query (e.g., 310) may be determined to be the word "country," and thus, the semantic sub-keys (e.g., 345, 520, 620, etc.) for the search may comprise a list of countries (e.g., as depicted in FIG. 5). In one embodiment, the semantic sub-keys (e.g., 345, 520, 620, etc.) associated with the webpages from the search results (e.g., 355, 365, etc.) with the highest rankings may be selected for display within region 1330 of GUI 1300. For example, a large majority of the highest ranked webpages may comprise the semantic sub-keys "Canada" and "Mexico," and thus, the words "Canada" and "Mexico" may be selected as answers to the question presented in the search query (e.g., 310) and consequently be displayed in region 1330.

Each of the answers displayed in region 1330 may be hyperlinked in one embodiment. As such, upon interacting with one of the answers displayed in region 1330, one or more webpages related to an activated answer may be displayed (e.g., to provide additional information related to the search query and/or the specific answer which was interacted with). Further, in one embodiment, the webpages brought up in response to interaction with an answer displayed in region 1330 may comprise at least one highlighted semantic sub-key and/or at least one highlighted keyword. As such, embodiments enable relevant information in the webpages to be more quickly located.

As shown in FIG. 13, region 1340 may comprise a listing of webpages (e.g., 1342-1346) generated from search result output 375. The webpages may comprise filtered search results (e.g., 355) and/or ranked search results (e.g., 365). In this manner, the listing of webpages in region 1340 may be ordered in accordance with the ranked search results (e.g., 365 output by ranking component 360). Additionally, one or more of the webpages may be hyperlinked in one embodiment. As such, upon interacting with one of the webpages displayed in region 1340, one or more additional webpages (e.g., related to the activated webpage listed in region 1340) may be displayed (e.g., to provide additional information related to the search query and/or the webpage which was interacted with).

Region 1340 may also comprise additional information 1343-1347, each related to a respective webpage listed in region 1340. Additional information 1343-1347 may comprise one or more words, phrases, passages, etc. of each respective webpage. Additionally, additional information 1343-1347 may comprise at least one highlighted semantic sub-key and/or at least one highlighted keyword. As such, embodiments enable relevant information in the webpages (e.g., listed in region 1340) to be more quickly located.

As shown in FIG. 14, GUI 1300 may also comprise region 1350 for displaying semantic keys and/or semantic sub-keys (e.g., used to generate search results displayed in region 1330 and/or region 1340). In one embodiment, at least one interactive graphical object (e.g., 1351-1355) may be displayed in region 1350, where each interactive graphical object may correspond to a semantic key and/or a semantic sub-key. The interactive graphical objects (e.g., 1351-1355) may be used to select or de-select a semantic key and/or a semantic sub-key. In one embodiment, selection of a semantic key and/or semantic sub-key may cause search results associated with the selected semantic key and/or semantic sub-key to be displayed in region 1330 and/or region 1340. Additionally, de-selection of a semantic key and/or semantic sub-key may cause search results associated with the selected semantic key and/or semantic sub-key to be hidden or not displayed (e.g., in region 1330 and/or region 1340). In this manner, in one embodiment, selection of interactive graphical object 1354 (e.g., associated with the semantic sub-key labeled "feet") and interactive graphical object 1355 (e.g., associated with the semantic sub-key labeled "meters") may cause the answers related to the respective semantic sub-keys to be displayed in region 1330. Additionally, selection of interactive graphical object 1354 and interactive graphical object 1355 may cause one or more webpages related to the related to the respective semantic sub-keys to be displayed in region 1340.

Interactive graphical objects (e.g., 1351-1355) displayed in region 1350 of GUI 1300 may be used to input or otherwise communicate input 377 (e.g., to a graphical data generator). In this manner, the interactive graphical objects may be used to alter the display of the search results (e.g., 375) without initiating a new webpage search in one embodiment.

Alternatively, the interactive graphical objects may also be used to initiate a new webpage search in one embodiment. For example, de-selection of a graphical object associated with a given semantic sub-key may cause the output of semantic sub-keys 345 (e.g., by semantic key processor 340) without the given semantic sub-key, which may in turn cause the semantic sub-key search results (e.g., 324) to be output (e.g., by search engine 320) without search results associated with the given semantic sub-key, and which in turn may affect the search results accessed and/or output by other components (e.g., filtering component 350, ranking component 360, graphical data generator 370, etc.). Accordingly, altering the active semantic sub-keys (e.g., by selecting or deselecting at least one semantic sub-key) displayed in region 1350 may alter the display of search results (e.g., 375) by generating a new webpage search (e.g., performed by search engine 320).

Interaction with an interactive graphical object associated with a superior or parent node may select or de-select all child nodes in one embodiment. For example, interaction with interactive graphical object 1351 may select or de-select all other semantic sub-keys displayed below interactive graphical object 1351 (e.g., 1352-1355). Additionally, interaction with interactive graphical object 1352 may select or de-select all other semantic sub-keys displayed below interactive graphical object 1352 and above interactive graphical object 1353 (e.g., 1354).

GUI 1300 may also comprise graphical object 1360 for updating the display of search results (e.g., 375) displayed in region 1330 and/or 1340. For example, in response to activating or deactivating a semantic sub-key displayed in region 1350, interaction with graphical object 1360 may update the display of search results (e.g., 375) displayed in region 1330 and/or 1340 without initiating a new webpage search (e.g., communicating input 377 with the new semantic sub-key configuration for altering search result output 375) in one embodiment. Alternatively, in response to activating or deactivating a semantic sub-key displayed in region 1350, interaction with graphical object 1360 may update the display of search results (e.g., 375) displayed in region 1330 and/or 1340 by initiating a new webpage search (e.g., based upon the new semantic sub-key configuration indicated by interactive graphical objects 1351-1355 of region 1350) in one embodiment. Further, it should be appreciated that the display of search results in GUI 1300 may be updated (e.g., with or without initiation of a new search) automatically (e.g., without interaction with graphical object 1360) in response to interaction with one or more interactive graphical objects (e.g., 1351-1355) displayed in region 1350 of GUI 1300.

Figure 15:
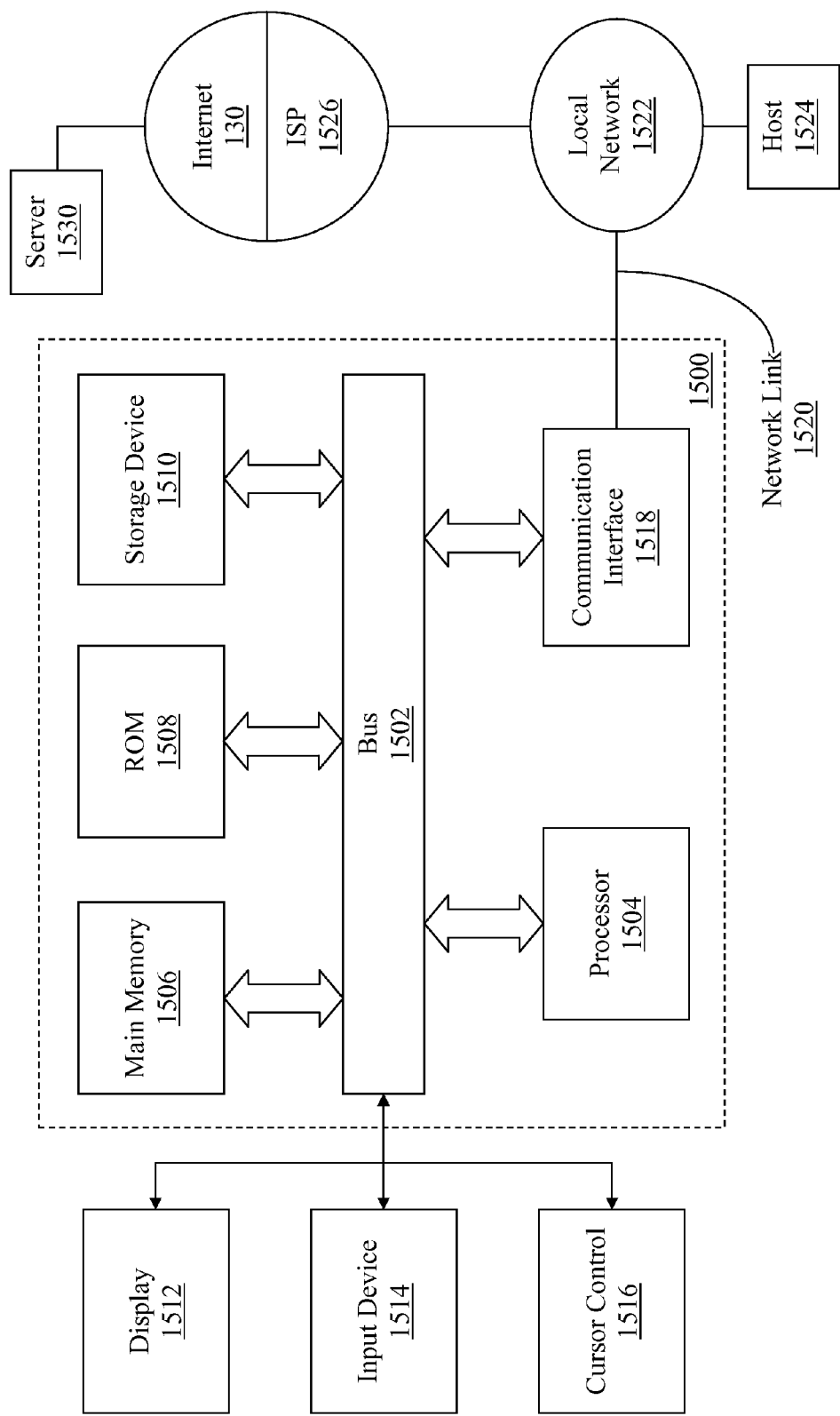
FIG. 15 shows an exemplary computer system upon which embodiments of the present invention may be implemented.

FIG. 15 shows exemplary computer system 1500 upon which embodiments of the present invention may be implemented. With reference to FIG. 15, portions of the present invention are comprised of computer-readable and computer-executable instructions that reside, for example, in computer system 1500 which may be used as a part of a general purpose computer network (not shown). It is appreciated that computer system 1500 of FIG. 15 is merely exemplary, and may implement computer systems 120*a* and/or 120*b* in one embodiment. As such, the present invention can operate within a number of different computer systems including general-purpose computer systems, embedded computer systems, laptop computer systems, hand-held computer systems, and stand-alone computer systems.

In the present embodiment, computer system 1500 includes an address/data bus 1502 for conveying digital information between the various components, a central processor unit (CPU) 1504 coupled to bus 1502 for processing the digital information and instructions, a volatile main memory 1506 coupled to bus 1502 comprised of volatile random access memory (RAM) for storing the digital information and instructions, and a non-volatile read only memory (ROM) 1508 coupled to bus 1502 for storing information and instructions of a more permanent nature. In addition, computer system 1500 may also include a data storage device 1510 (e.g., a magnetic, optical, floppy, tape drive, etc.) coupled to bus 1502 for storing larger amounts of data. Data (e.g., comprising instructions, commands, etc.) for performing a process (e.g., 900, 1000, 1100, etc.) for processing log file data and/or for displaying the processed log file data may be stored in main memory 1506, ROM 1508, storage device 1510, registers within processor 1504 (not shown), in an external storage device (not shown), or some combination thereof.

As shown in FIG. 15, computer system 1500 may be coupled via bus 1502 to an optional display device 1512 (e.g., a CRT monitor, LCD monitor, etc.) for displaying information received from computer system 1500. An optional input device 1514 (e.g., an alphanumeric keyboard) may also be coupled to computer system 1500 via bus 1502 for communicating information and command selections to processor 1504. Cursor control device 1516 (e.g., a mouse, trackball, light pen, etc.) may also be coupled to computer system 1500 via bus 1502 for communicating direction information and command selections to processor 1504 and for controlling cursor movement (e.g., on display 1512). Additionally, computer system 1500 can include a mechanism for emitting an audible signal (not shown).

Computer system 1500 may also include a communication interface 1518 coupled to bus 1502. Communication interface 1518 provides a two-way data communication coupling to local network 1522 via network link 1520. For example, communication interface 1518 may be an integrated services digital network (ISDN) device or a modem to provide a data communication connection to a corresponding type of telephone line. As another example, communication interface 1518 may be a local area network (LAN) device to provide a data communication connection to a compatible LAN. And as yet another example, network link 1520 may comprise a wireless connection between communication interface 1518 and local network 1522. Regardless of the implementation utilized, communication interface 1518 may send and receive electrical, electromagnetic, and/or optical signals that carry digital data streams representing various types of information.

As shown in FIG. 15, network link 1520 may provide data communication through one or more networks to other data devices. For example, network link 1520 may provide a connection through local network 1522 to a host computer 1524 or to data equipment operated by internet service provider (ISP) 1526. ISP 1526 in turn provides data communication services through the worldwide packet data communication network, now commonly referred to as the "internet" 130. Local network 1522 and internet 130 may use electrical, electromagnetic, and/or optical signals to convey digital data streams. The signals through the various networks and network link 1520, which carry digital data to and from computer system 1500, are exemplary forms of carrier waves transporting information.

Accordingly, computer system 1500 can send and receive messages through network(s), network link 1520, and communication interface 1518. For example, server 1530 might transmit a requested code for an application program through internet 130, ISP 1526, local network 1522, and communication interface 1518. The received code may be executed by processor 1504 upon receipt, and/or be stored in one of the coupled memory devices (e.g., storage device 1510, ROM 1508, RAM 1506, etc.) for later execution.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of processing search results, said method comprising:
    determining a semantic sub-key associated with at least one keyword of a search query;
    accessing said search results generated from a search performed based on said search query, wherein each search result of said search results comprises at least one respective instance of said semantic sub-key;
    determining a respective frequency of said at least one respective instance of said semantic sub-key in each search result of said search results; and
    ranking said search results based on said respective frequency of said at least one respective instance of said semantic sub-key, wherein said semantic sub-key is selected from a group consisting of a hyponym and a numerical expression.

2. The computer-implemented method of claim 1, wherein said determining said semantic sub-key further comprises: determining a semantic key related to at least one portion of said search query; and determining said semantic sub-key based on said semantic key.

3. The computer-implemented method of claim 2, wherein said determining said semantic key further comprises: accessing said search query; determining, using a grammatical analyzer, a focus of said search query; and determining said semantic key based on said focus.

4. The computer-implemented method of claim 1 further comprising: performing said search based on said search query to generate a plurality of search results; and generating said search results by filtering, based on said semantic sub-key, said plurality of search results.

5. The computer-implemented method of claim 1 further comprising: selecting, based on a user input, said semantic key from a plurality of semantic keys, wherein said plurality of semantic keys is associated with said search query.

6. The computer-implemented method of claim 1 further comprising: generating data for displaying information selected from a group consisting of a listing of said search results and an answer to a question posed using said search query, wherein said answer comprises said semantic sub-key and at least a portion of said search results.

7. The computer-implemented method of claim 1 further comprising:
    adjusting the respective frequency of said at least one respective instance of said semantic sub-key based on a size of a respective search result.

8. A non-transitory computer-readable storage medium having computer-readable program code embodied therein executable by a computer system causing the computer system to perform a method of processing search results, said method comprising:
    determining a semantic sub-key associated with at least one keyword of a search query;
    accessing said search results generated from a search performed based on said search query, wherein each search result of said search results comprises at least one respective instance of said semantic sub-key;
    determining at least one respective proximity between said at least one respective instance of said semantic sub-key and at least one respective instance of said at least one keyword in each search result of said search results; and
    ranking said search results based on said at least one respective proximity between said at least one respective instance of said semantic sub-key and said at least one respective instance of said at least one keyword, wherein said semantic sub-key is selected from a group consisting of a hyponym and a numerical expression, wherein said determining said semantic sub-key further comprises determining a semantic key related to at least one portion of said search query, and determining said semantic sub-key based on said semantic key.

9. The computer-readable storage medium of claim 8, wherein said determining said semantic key further comprises: accessing said search query; determining, using a grammatical analyzer, a focus of said search query; and determining said semantic key based on said focus.

10. The computer-readable storage medium of claim 8, wherein said method further comprises: performing said search based on said search query to generate a plurality of search results; and generating said search results by filtering, based on said semantic sub-key, said plurality of search results.

11. The computer-readable storage medium of claim 8, wherein said method further comprises: selecting, based on a user input, said semantic key from a plurality of semantic keys, wherein said plurality of semantic keys is associated with said search query.

12. The computer-readable storage medium of claim 8, wherein said method further comprises:

generating data for displaying information selected from a group consisting of a listing of said search results and an answer to a question posed using said search query, wherein said answer comprises said semantic sub-key and at least a portion of said search results.

13. A system comprising a processor and a memory, wherein said memory comprises instructions that when executed by said processor implement a method of processing search results, said method comprising:

determining a semantic sub-key associated with at least one keyword of a search query;

accessing said search results generated from a search performed based on said search query, wherein each search result of said search results comprises at least one respective instance of said semantic sub-key;

determining is done using a respective frequency of said at least one respective instance of said semantic sub-key in each search result of said search results; and ranking said search results based on said respective frequency of said at least one respective instance of said semantic sub-key, wherein said semantic sub-key is selected from a group consisting of a hyponym and a numerical expression, and wherein said determining said semantic sub-key further comprises determining a semantic key related to at least one portion of said search query, and determining said semantic sub-key based on said semantic key, and wherein said determining said semantic key further comprises:

accessing said search query;

determining, using a grammatical analyzer, a focus of said search query; and determining said semantic key based on said focus.

14. The system of claim 13, wherein said method further comprises: performing said search based on said search query to generate a plurality of search results; and generating said search results by filtering, based on said semantic sub-key, said plurality of search results.

15. The system of claim 13, wherein said method further comprises: selecting, based on a user input, said semantic key from a plurality of semantic keys, wherein said plurality of semantic keys is associated with said search query.

16. The system of claim 13, wherein said method further comprises:

generating data for displaying information selected from a group consisting of a listing of said search results and an answer to a question posed using said search query, wherein said answer comprises said semantic sub-key and at least a portion of said search results.

* * * * *